(12) United States Patent
Chae et al.

(10) Patent No.: US 10,217,435 B2
(45) Date of Patent: Feb. 26, 2019

(54) ELECTRONIC DEVICE FOR DISPLAYING SCREEN AND METHOD OF CONTROLLING SAME

(71) Applicant: Samsung Electronics Co., Ltd., Gyeonggi-do (KR)

(72) Inventors: Sang-Won Chae, Seoul (KR); Jung-Eun Lee, Suwon-si (KR); Hyoung-Il Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 73 days.

(21) Appl. No.: 15/139,211

(22) Filed: Apr. 26, 2016

(65) Prior Publication Data

US 2016/0343344 A1 Nov. 24, 2016

(30) Foreign Application Priority Data

May 20, 2015 (KR) ........................ 10-2015-0070454

(51) Int. Cl.
*G09G 5/00* (2006.01)
*G06T 19/00* (2011.01)
(Continued)

(52) U.S. Cl.
CPC ........... *G09G 5/003* (2013.01); *G02B 27/017* (2013.01); *G02B 27/0179* (2013.01); *G06F 3/011* (2013.01); *G06F 3/012* (2013.01); *G06F 3/015* (2013.01); *G06T 19/006* (2013.01); *G09G 5/38* (2013.01); *G02B 2027/014* (2013.01); *G02B 2027/0183* (2013.01); *G02B 2027/0187* (2013.01); *G09G 2340/0464* (2013.01); *G09G 2354/00* (2013.01)

(58) Field of Classification Search
CPC .......... G06K 9/00664–9/00704; G06F 3/0481; G06F 3/04817; G06F 9/4443; G06F 3/04847; G06F 11/3664; G06F 3/011; G06F 3/012; G06F 3/0304; G06T 19/00; G06T 17/00; G06T 19/006; G06T 2215/16; H04N 5/272; H04N 2201/3245; A63F 13/10
See application file for complete search history.

(56) References Cited

U.S. PATENT DOCUMENTS 6,590,536 B1 7/2003 Walton
8,010,308 B1 * 8/2011 Churchill ............... G01C 21/16
702/104

(Continued)

FOREIGN PATENT DOCUMENTS

JP 2012119944 6/2012
JP 2012119944 A * 6/2012
(Continued)

OTHER PUBLICATIONS

Partial European Search Report dated Oct. 17, 2016 in connection with European Application No. 16170563.7, 9 pages.

*Primary Examiner* — Todd Buttram

(57) ABSTRACT

Disclosed is a method of controlling an electronic device and an electronic device. The method may include: acquiring motion information of an electronic device; performing an inertial force correction for removing a part by an inertial force from the acquired motion information; and displaying a screen corresponding to the inertial force-corrected motion information.

14 Claims, 38 Drawing Sheets

(51) Int. Cl.
*G09G 5/38* (2006.01)
*G06F 3/01* (2006.01)
*G02B 27/01* (2006.01)

(56) References Cited

U.S. PATENT DOCUMENTS

| | | | |
|---|---|---|---|
| 2006/0013309 A1* | 1/2006 | Ha | H04N 19/147 |
| | | | 375/240.16 |
| 2007/0086669 A1* | 4/2007 | Berger | G06K 9/2081 |
| | | | 382/243 |
| 2007/0146323 A1 | 6/2007 | Nishikata et al. | |
| 2010/0150404 A1* | 6/2010 | Marks | G06T 7/20 |
| | | | 382/107 |
| 2012/0176413 A1* | 7/2012 | Kulik | G06F 1/1626 |
| | | | 345/659 |
| 2012/0249587 A1 | 10/2012 | Anderson et al. | |
| 2014/0306866 A1 | 10/2014 | Miller et al. | |
| 2015/0146926 A1* | 5/2015 | Ramachandran | G06K 9/00624 |
| | | | 382/103 |
| 2015/0301607 A1* | 10/2015 | Saka | G06F 3/017 |
| | | | 345/175 |

FOREIGN PATENT DOCUMENTS

| | | |
|---|---|---|
| KR | 10-2011-0116422 | 10/2011 |
| KR | 10-2015-0006128 | 1/2015 |

* cited by examiner

ELECTRONIC DEVICE FOR DISPLAYING SCREEN AND METHOD OF CONTROLLING SAME

CROSS-REFERENCE TO RELATED APPLICATION(S) AND CLAIM OF PRIORITY

The present application is related to and claims benefit under 35 U.S.C. § 119(a) to Korean Application Serial No. 10-2015-0070454, which was filed in the Korean Intellectual Property Office on May 20, 2015, the entire content of which is hereby incorporated by reference.

TECHNICAL FIELD

The present disclosure relates to an electronic device for displaying a screen and a method of controlling the same.

BACKGROUND

Electronic devices may be wearable by a user and may be known as wearable devices. The wearable devices may include a head mounted electronic device such as a Head Mounted Display (HMD).

The HMD device may be worn on a user's body part (for example, the user's head) and provide a virtual reality environment to the user. The virtual reality environment may be provided, for example, by displaying a screen and/or various user interfaces which can implement the virtual reality.

An HMD may sense an acceleration or an angular acceleration and display a screen in accordance with the sensed acceleration or angle acceleration. Accordingly, the HMD may change and display the screen in accordance with a user's motion, and the user may experience actual reality by viewing the changed screen. Meanwhile, the user may board a transportation means while wearing the HMD. In this case, the transportation means may accelerate. For example, when the user takes a subway, the subway may accelerate at a departure time point or an arrival time point. The acceleration of the transportation means may result in an inertial force applied to the HMD included in an inertial frame of the transportation means. The HMD may sense the inertial force and change the screen in accordance with the inertial force. Accordingly, the HMD may display a screen which the user does not want.

SUMMARY

To address the above-discussed deficiencies, it is an object to provide, for use in an electronic device for correcting an inertial force and a method of controlling the same.

In accordance with an aspect of the present disclosure, a method of controlling an electronic device is provided. The method includes: an operation of acquiring motion information of an electronic device; an operation of performing an inertial force correction for removing a part by an inertial force from the acquired motion information; and an operation of displaying a screen corresponding to the inertial force-corrected motion information.

In accordance with another aspect of the present disclosure, an electronic device is provided. The electronic device includes: a display; a processor electrically connected to the display; a memory electrically connected to the processor; and a motion information sensing module that is electrically connected to the processor and acquires motion information of the electronic device, wherein the memory stores instructions to instruct the processor to perform an inertial force correction for removing a part by an inertial force from the acquired motion information and to control the display to display a screen corresponding to the inertial force-corrected motion information when the instructions are executed.

Embodiments of the present disclosure may provide an electronic device for correcting an inertial force and a method of controlling the same. Accordingly, when a user wears the electronic devices and boards a transportation means that accelerates, the electronic device may display a screen corresponding to a motion intended by the user. Therefore, it is possible to solve the problem in which the user views an unintended screen due to the inertial force.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
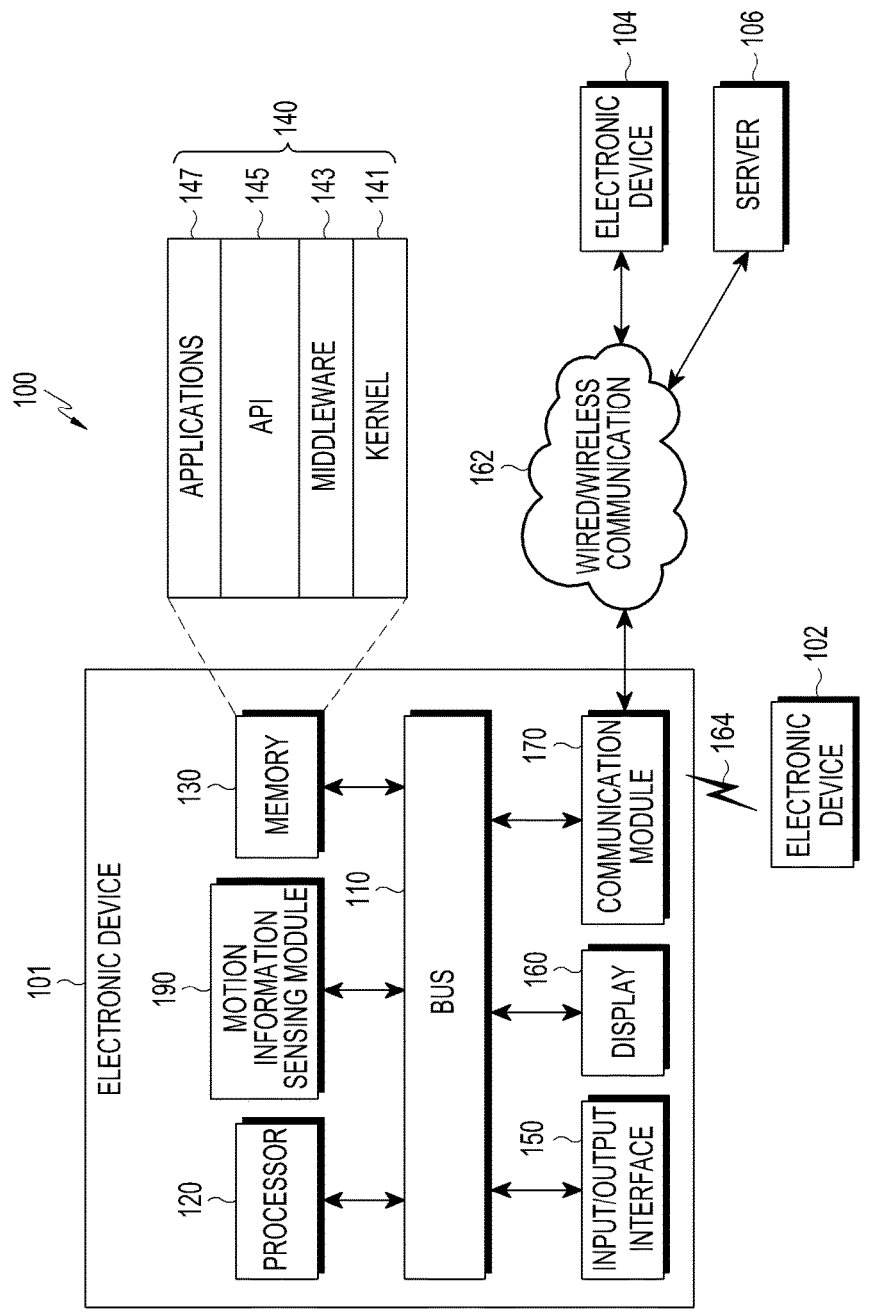
FIG. 1 illustrates a block diagram of an electronic device and a network according to various embodiments of the present disclosure.

FIGS. 1 through 23, discussed below, and the embodiments used to describe the principles of the present disclosure in this patent document are by way of illustration and should not be construed in any way to limit the scope of the disclosure. Those skilled in the art will understand that the principles of the present disclosure may be implemented in any suitably arranged electronic device. Hereinafter, embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there are no elements (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) for performing the corresponding operations or a generic-purpose processor (e.g., central processing unit (CPU) or application processor (AP)) that can perform the corresponding operations by executing one or more software programs stored in a memory device.

The terms used herein are merely for the purpose of describing particular embodiments and are not intended to limit the scope of other embodiments. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, or a wearable device. According to embodiments, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), or a bio-implantable type (e.g., an implantable circuit).

According to some embodiments, the electronic device may be a home appliance. The home appliance may include at least one of, for example, a television, a digital video disc (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV®, a game console (e.g., Xbox® and PlayStation®), an electronic dictionary, an electronic key, a camcorder, or an electronic photo frame.

According to another embodiment, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, or an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). In embodiments, the electronic device may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology.

Hereinafter, electronic devices, according to various embodiments of the present disclosure, will be described with reference to the accompanying drawings. As used herein, the term "user" may indicate a person who uses an electronic device or a device (e.g., an artificial intelligence electronic device) that uses an electronic device.

An electronic device 101 within a network environment 100, according to various embodiments, will be described with reference to FIG. 1. The electronic device 101 may include a bus 110, a processor 120, a memory 130, an input/output interface 150, a display 160, and a communication interface 170. In some embodiments, the electronic device 101 may omit at least one of the above elements or may further include other elements.

The bus 110 may include, for example, a circuit which interconnects the components 110 to 170 and delivers communication (for example, a control message and/or data).

The processor 120 may include one or more of a central processing unit (CPU), an application processor (AP), and/or a communication processor (CP). For example, the processor 120 may carry out operations or data processing related to control and/or communication of at least one other component of the electronic device 101.

The memory 130 may include a volatile memory and/or a non-volatile memory. The memory 130 may store, for example, instructions or data relevant to at least one other element of the electronic device 101. According to an embodiment, the memory 130 may store software and/or a program 140. The program 140 may include a kernel 141, middleware 143, an application programming interface (API) 145, and/or an application program (or "application") 147. At least some of the kernel 141, the middleware 143, and the API 145 may be referred to as an operating system (OS).

The kernel 141 may control or manage, for example, system resources (for example, the bus 110, the processor 120, and the memory 130) which are used to execute an operation or a function implemented in the other programs (for example, the middleware 143, the API 145, and the application programs 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data.

The middleware 143 may process one or more task requests, which are received from the application programs 147, according to priorities thereof. For example, the middleware 143 may assign a priority for using the system resources (for example, the bus 110, the processor 120, the memory 130, or the like) of the electronic device 101 to at least one of the application programs 147. For example, the middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include, for example, at least one interface or function (for example, instruction) for file control, window control, image processing, or text control.

The input/output interface 150 may function as, for example, an interface that may transfer a command or data input from a user or another external device to the other element(s) of the electronic device 101. Furthermore, the input/output interface 150 may output instructions or data received from the other element(s) of the electronic device 101 to the user or the other external device.

The display 160 may include, for example, a liquid crystal display (LCD), a light-emitting diode (LED) display, an organic light-emitting diode (OLED) display, a microelectromechanical systems (MEMS) display, and an electronic paper display. The display 160 may display, for example, various types of contents (for example, text, images, videos, icons, or symbols) to the user. The display 160 may include a touch screen and receive, for example, a touch, gesture, proximity, or hovering input using an electronic pen or the user's body part.

The communication interface 170 may set, for example, communication between the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may use, for example, at least one of long term evolution (LTE), LTE-Advance (LTE-A), code division multiple access (CDMA), wideband CDMA (WCDMA), universal mobile telecommunications system (UMTS), wireless broadband (WiBro), global system for mobile communications (GSM) and the like, for example, as a cellular communication protocol. In addition, the wireless communication may include, for example, short range communication 164. The short range communication 164 may include at least one of, for example, Wi-Fi, Bluetooth®, near field communication (NFC), and global navigation satellite system (GNSS). The GNSS may include at least one of, for example, a global positioning system (GPS), a Russian global navigation satellite system (GLONASS), a BeiDou navigation satellite system (hereinafter, referred to as "BeiDou"), and a European global satellite-based navigation system (hereinafter, referred to as GALILEO). Hereinafter, in the present disclosure, the term "GPS" may be interchangeably used with the term "GNSS". The wired communication may include at least one of, for example, a universal serial bus (USB), a high definition multimedia interface (HDMI), recommended standard 232 (RS-232), and a plain old telephone service (POTS). The network 162 may include at least one of a communication network such as a computer network (for example, a LAN or a WAN), the Internet, and a telephone network.

Each of the first and second external electronic devices 102 and 104 may be of a type identical to or different from that of the electronic device 101. According to an embodiment, the server 106 may include a group of one or more servers. According to embodiments, all or some of the operations performed in the electronic device 101 may be performed in another electronic device or a plurality of electronic devices (for example, the electronic devices 102 and 104 or the server 106). According to an embodiment, when the electronic device 101 has to perform a function or service automatically or in response to a request, the electronic device 101 may request another device (for example, the electronic device 102 or 104, or the server) to perform at least some functions relating thereto, instead of autonomously or additionally performing the function or service. Another electronic device (for example, the electronic device 102 or 104 or the server 106) may execute the requested functions or the additional functions, and may deliver a result of the execution to the electronic device 101. The electronic device 101 may process the received result as it is or additionally process the result and provide the requested functions or services. To achieve this, for example, cloud computing, distributed computing, or client-server computing technology may be used.

The electronic device 101 may include a motion information sensing module 190 that is electrically connected to the processor 120 and acquires motion information of the electronic device 120. The motion information sensing module 190 may include at least one of a linear acceleration sensor, a gyro sensor, and a geomagnetic field sensor, which can sense linear accelerations, rotation angle accelerations, or orientation information of the electronic device. The electronic device 101 may acquire motion information of the electronic device 101 based on output values from the sensors. For example, the electronic device 101 may acquire a linear acceleration of the electronic device 101 based on the output value from the linear acceleration sensor. The electronic device 101 may acquire a rotation angle acceleration of the electronic device 101 based on the output value from the gyro sensor. The electronic device 101 may acquire a motion in orientation information on the electronic device 101 based on the output value from each of the gyro sensor and the geomagnetic sensor.

According to embodiments of the present disclosure, the processor 120 may be electrically connected to the display 160. Further, the processor 120 may be electrically connected to the memory 130. The memory 130 may store instructions to instruct the processor 120 to perform an inertial force correction to remove an inertial force component from the acquired motion information and to display a screen corresponding to the inertial force-corrected motion information.

According to embodiments of the present disclosure, the memory 130 may further store instructions to instruct the processor 120 to acquire the inertial force component when the instructions are executed.

According to embodiments of the present disclosure, the communication module 170 may receive the inertial force component from another electronic device which is physically separated from the electronic device and senses the inertial force component.

According to embodiments of the present disclosure, the memory 130 may further store instructions to instruct the processor 120 to generate a corrected vector by adding an inverse vector of an inertial acceleration corresponding to the inertial force component and an acceleration corresponding to the motion information and to control the display 160 to display a screen corresponding to the generated corrected vector when the instructions are executed.

According to various embodiments of the present disclosure, the memory 130 may further store instructions to instruct the processor 120 to acquire a biometric signal from at least one user's body part which generates the biometric signal when the user moves the electronic device and to remove the inertial force component which corresponds to motion information acquired while the biometric signal is not acquired when the instructions are executed. The electronic device 101 may further include a sensor that may acquire a biometric signal and the processor 120 may acquire a biometric signal from a biometric signal sensor.

According to various embodiments of the present disclosure, the memory 130 may further store instructions to instruct the processor 120 to determine whether the motion information is included in a preset range and to remove the inertial force component which corresponds to motion information which is outside the preset range when the instructions are executed.

According to various embodiments of the present disclosure, the memory 130 may further store instructions to instruct the processor 120 to acquire orientation information of the electronic device 101 and to remove the inertial force component which corresponds to motion information acquired while orientation information is not changed when the instructions are executed.

According to various embodiments of the present disclosure, the memory 130 may further store instructions to instruct the processor 120 to remove the inertial force component which corresponds to a linear component of the motion information when the instructions are executed.

According to various embodiments of the present disclosure, the memory 130 may further store instructions to instruct the processor 120 to control the display to display the screen in accordance with a rotation component of the motion information when the instructions are executed.

The electronic device 101 may further include a camera module (not shown) captures a plurality of images of an external environment of the electronic device and outputs the plurality of images to the processor. According to various embodiments of the present disclosure, the memory 130 may further store instructions to instruct the processor 120 to remove the inertial force component which corresponds to motion information acquired while adjacent images of the plurality of images are not changed when the instructions are executed.

According to various embodiments of the present disclosure, the memory 130 may further store instructions to instruct the processor 120 to acquire motion information of the electronic device based on a difference between adjacent images of the plurality of images and to control the display to display a screen corresponding to the acquired motion information when the instructions are executed.

According to various embodiments of the present disclosure, the memory 130 may further store instructions to instruct the processor 120 to acquire motion information of the electronic device based on a relative location of the electronic device with respect to the other electronic device and to control the display to display a screen corresponding to the acquired motion information when the instructions are executed.

Figure 2:
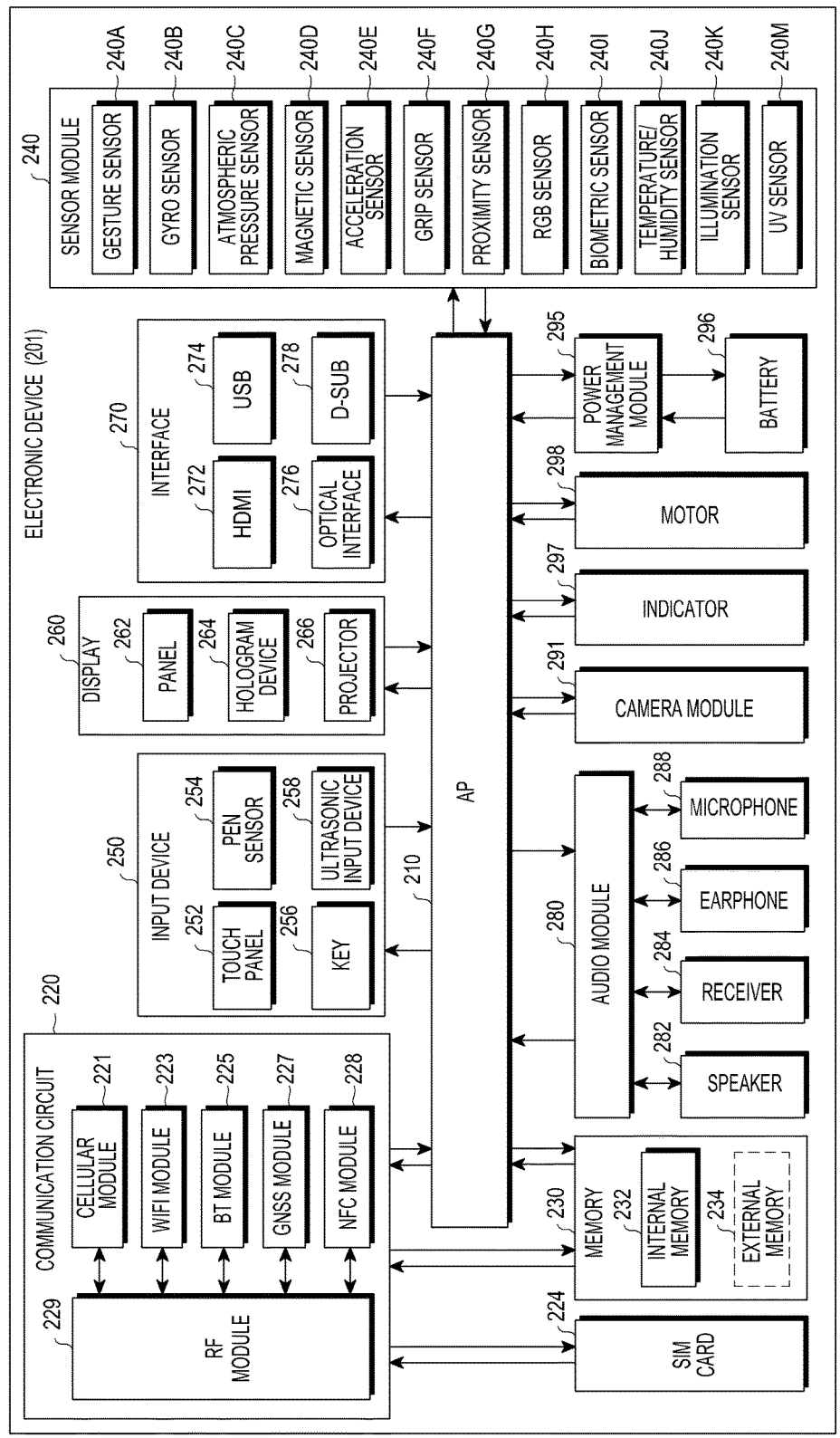
FIG. 2 illustrates a block diagram of an electronic device according to various embodiments.

FIG. 2 illustrates a block diagram of an electronic device 201 according to various embodiments. The electronic device 201 may include, for example, the whole or part of the electronic device 101 illustrated in FIG. 1. The electronic device 201 may include at least one application processor (AP) 210, a communication module 220, a subscriber identification module 224, a memory 230, a sensor module 240, an input device 250, a display 260, an interface 270, an audio module 280, a camera module 291, a power management module 295, a battery 296, an indicator 297, and a motor 298.

The processor 210 may drive, for example, an operating system or application programs to control a plurality of hardware or software elements connected thereto and to perform various types of data processing and operations. The processor 210 may be implemented by, for example, a system on chip (SoC). According to an embodiment, the processor 210 may further include a graphic processing unit (GPU) and/or an image signal processor. The processor 210 may also include at least some (for example, a cellular module 221) of the elements illustrated in FIG. 2. The processor 210 may load, in a volatile memory, commands or data received from at least one of the other elements (for example, a non-volatile memory) to process the commands or data, and may store various types of data in the non-volatile memory.

The communication module 220 may have a configuration equal or similar to that of the communication interface 170 of FIG. 1. The communication module 220 may include, for example, a cellular module 221, a Wi-Fi module 223, a Bluetooth® (BT) module 225, a GNSS module 227 (for example, a GPS module, a GLONASS module, a BeiDou module, or a GALILEO module), an NFC module 228, and a radio frequency (RF) module 229.

The cellular module 221 may provide a voice call, an image call, a text message service, or an Internet service through, for example, a communication network. According to an embodiment, the cellular module 221 may identify and authenticate the electronic device 201 within a communication network using a subscriber identification module 224 (for example, a SIM card). According to an embodiment, the cellular module 221 may perform at least some of the functions, which can be provided by the processor 210. According to an embodiment of the present disclosure, the cellular module 221 may include a communication processor (CP).

Each of the Wi-Fi module 223, the BT module 225, the GNSS module 227, and the NFC module 228 may include, for example, a processor for processing data transmitted/received through the corresponding module. According to some embodiments, at least some (two or more) of the cellular module 221, the Wi-Fi module 223, the BT module 225, the GNSS module 227, and the NFC module 228 may be included in one integrated chip (IC) or IC package.

The RF module 229 may transmit/receive, for example, a communication signal (for example, an RF signal). The RF module 229 may include, for example, a transceiver, a power amp module (PAM), a frequency filter, a low noise amplifier (LNA), or an antenna. According to another embodiment of the present disclosure, at least one of the cellular module 221, the Wi-Fi module 223, the BT module 225, the GNSS module 227, and the NFC module 228 may transmit/receive an RF signal through a separate RF module.

The subscriber identification module 224 may include, for example, a card including a subscriber identity module (SIM) and/or an embedded SIM, and may contain unique identification information (for example, an integrated circuit card identifier (ICCID)) or subscriber information (for example, an international mobile subscriber identity (IMSI)).

The memory 230 (for example, the memory 130) may include, for example, an internal memory 232 or an external memory 234. The internal memory 232 may include at least one of, for example, a volatile memory (for example, a dynamic random access memory (DRAM), a static RAM (SRAM), a synchronous dynamic RAM (SDRAM), and the like) and a non-volatile memory (for example, a one-time programmable read only memory (OTPROM), a programmable ROM (PROM), an erasable and programmable ROM (EPROM), an electrically erasable and programmable ROM (EEPROM), a mask ROM, a flash ROM, a flash memory (for example, a NAND flash memory, a NOR flash memory, and the like), a hard disk drive, and a solid state drive (SSD)).

An external memory 234 may further include a flash drive, for example, a compact flash (CF), a secure digital (SD), a micro secure digital (micro-SD), a mini secure digital (Mini-SD), an eXtreme Digital (xD), a multi-media card (MMC), a memory stick, or the like. The external memory 234 may be functionally and/or physically connected to the electronic device 201 through various interfaces.

The sensor module 240 may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, a light sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor, which is configured to control the sensor module 240, as a part of the processor 210 or separately from the processor 210 in order to control the sensor module 240 while the processor 210 is in a sleep state.

The input device 250 may include, for example, a touch panel 252, a (digital) pen sensor 254, a key 256, and/or an ultrasonic input unit 258. The touch panel 252 may use, for example, at least one of a capacitive type, a resistive type, an infrared type, and an ultrasonic type. Further, the touch panel 252 may further include a control circuit. The touch panel 252 may further include a tactile layer to provide a tactile reaction to a user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect ultrasonic waves generated by an input tool through a microphone (for example, a microphone 288) and identify data corresponding to the detected ultrasonic waves.

The display 260 (for example, the display 160) may include a panel 262, a hologram device 264 or a projector 266. The panel 262 may include a configuration identical or similar to that of the display 160 illustrated in FIG. 1. The panel 262 may be implemented to be, for example, flexible, transparent, or wearable. The panel 262 and the touch panel 252 may be implemented as one module. The hologram 264 may show a three dimensional image in the air by using an interference of light. The projector 266 may display an image by projecting light onto a screen. The screen may be located, for example, in the interior of or on the exterior of the electronic device 201. According to an embodiment, the display 260 may further include a control circuit for controlling the panel 262, the hologram device 264, or the projector 266.

The interface 270 may include, for example, a high-definition multimedia interface (HDMI) 272, a universal serial bus (USB) 274, an optical interface 276, or a D-sub-miniature (D-sub) 278. The interface 270 may be included in, for example, the communication interface 170 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280 may bilaterally convert, for example, a sound and an electrical signal. At least some elements of the audio module 280 may be included in, for example, the input/output interface 145 illustrated in FIG. 1. The audio module 280 may process sound information which is input or output through, for example, a speaker 282, a receiver 284, earphones 286, the microphone 288 or the like.

The camera module 291, which can take a still image and a moving image, may include one or more image sensors (for example, a front or rear sensor), a lens, an image signal processor (ISP), or a flash (for example, an LED, a xenon lamp, or the like) according to an embodiment.

The power management module 295 may manage, for example, power of the electronic device 201. According to an embodiment, the power management module 295 may include a power management integrated circuit (PMIC), a charger IC, or a battery fuel gauge. The PMIC may use a wired and/or wireless charging method. Examples of the wireless charging method may include, for example, a magnetic resonance method, a magnetic induction method, an electromagnetic method, and the like. Additional circuits (for example, a coil loop, a resonance circuit, a rectifier, etc.) for wireless charging may be further included. The battery gauge may measure, for example, a residual quantity of the battery 296, and a voltage, a current, or a temperature during the charging. The battery 296 may include, for example, a rechargeable battery and/or a solar battery.

The indicator 297 may display a specific state, for example, a booting state, a message state, a charging state, of the electronic device 201 or a part of the electronic device 201 (for example, the processor 210). The motor 298 may convert an electrical signal into mechanical vibrations, and may generate a vibration or haptic effect. Although not illustrated, the electronic device 201 may include a processing unit (for example, a GPU) for supporting a mobile television (TV). The processing unit for supporting mobile TV may process media data according to a standard, such as, for example, digital multimedia broadcasting (DMB), digital video broadcasting (DVB), MediaFLO™, or the like.

Each of the above-described component elements of hardware according to the present disclosure may be configured with one or more components, and the names of the corresponding component elements may vary based on the type of electronic device. The electronic device according to embodiments of the present disclosure may include at least one of the aforementioned elements. Some elements may be omitted or other additional elements may be further included in the electronic device. Also, some of the hardware components according to embodiments may be combined into one entity, which may perform functions identical to those of the relevant components before the combination.

Figure 3:
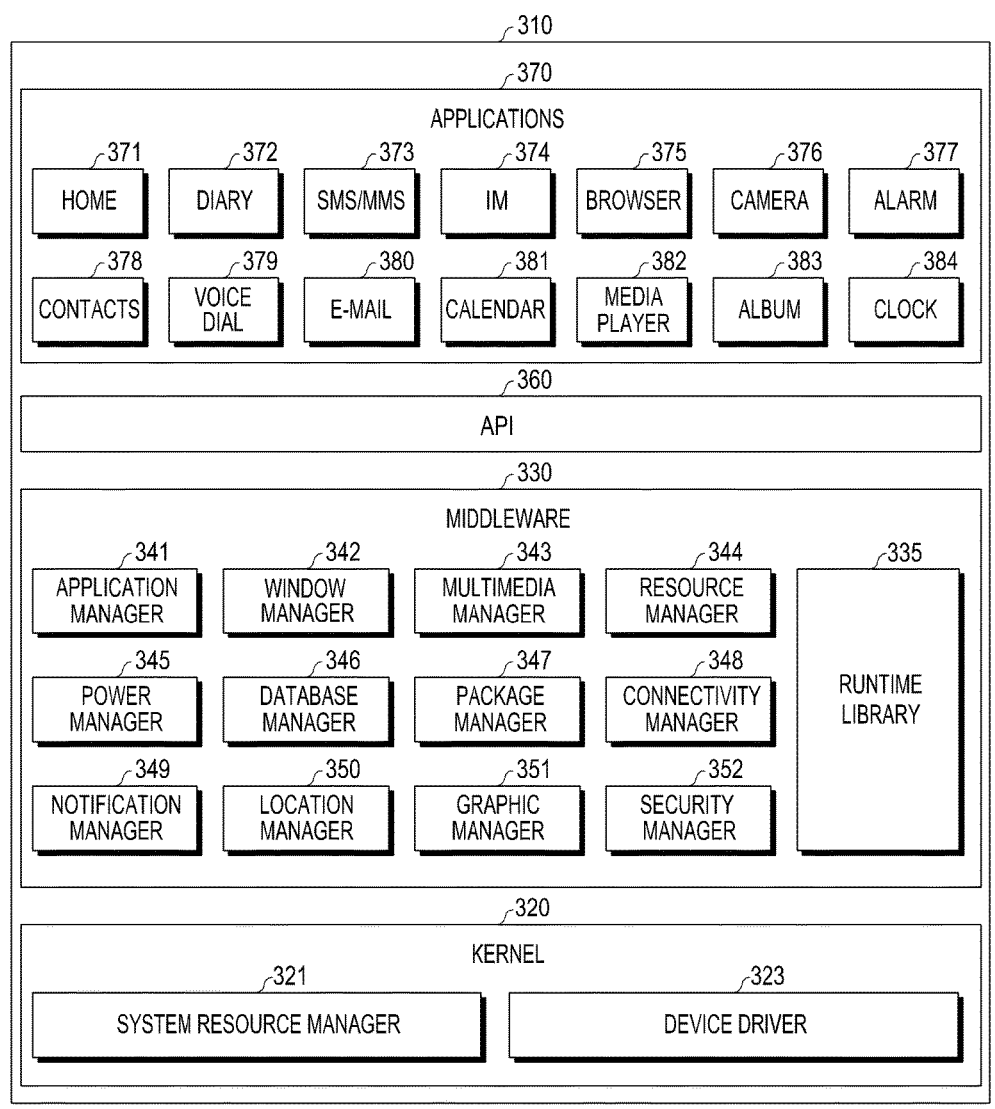
FIG. 3 illustrates a block diagram of a program module according to various embodiments.

FIG. 3 illustrates a block diagram of a program module according to embodiments of the present disclosure. According to an embodiment, the program module 310 (for example, the program 140) may include an operating system (OS) for controlling resources related to the electronic device (for example, the electronic device 101) and/or various applications (for example, the application programs 147) executed in the operating system. The operating system may be, for example, Android®, iOS®, Windows®, Symbian®, Tizen®, Samsung Bada OS®, or the like.

The program module 310 may include a kernel 320, middleware 330, an application programming interface (API) 360, and/or an application 370. At least some of the program module 310 may be preloaded on the electronic device, or may be downloaded from an external electronic device (for example, the electronic device 102 or 104, or the server 106).

The kernel 320 (for example, the kernel 141) may include, for example, a system resource manager 321 and/or a device driver 323. The system resource manager 321 may control, assign, or collect system resources. According to an embodiment, the system resource manager 321 may include a process manager, a memory manager, or a file system manager. The device driver 323 may include, for example, a display driver, a camera driver, a Bluetooth driver, a shared-memory driver, a USB driver, a keypad driver, a Wi-Fi driver, an audio driver, or an inter-process communication (IPC) driver.

The middleware 330 may provide a function required by the applications 370 in common or provide various functions to the applications 370 through the API 360 so that the applications 370 can efficiently use limited system resources within the electronic device. According to an embodiment, the middleware 330 (for example, the middleware 143) may include, for example, at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while the applications 370 are being executed. The runtime library 335 may perform input/output management, memory management, or a function for an arithmetic function.

The application manager 341 may, for example, manage a life cycle of at least one of the applications 370. The window manager 342 may manage graphical user interface (GUI) resources used on a screen. The multimedia manager 343 may identify formats required for the reproduction of various media files and encode or decode a media file using a codec suitable for the corresponding format. The resource manager 344 may manage resources of at least one of the applications 370, such as a source code, a memory, and a storage space.

The power manager 345 may operate together with, for example, a basic input/output system (BIOS) to manage a battery or power and may provide power information required for the operation of the electronic device. The database manager 346 may generate, search, or change a database to be used in at least one of the applications 370. The package manager 347 may manage the installation or the updating of an application distributed in the form of a package file.

The connectivity manager 348 may manage a wireless connection such as, for example, Wi-Fi or BT. The notification manager 349 may display or notify of an event, such as an arrival message, an appointment, proximity notification, and the like, in such a manner of not disturbing a user. The location manager 350 may manage location information of the electronic device. The graphic manager 351 may manage a graphic effect to be provided to a user and a user interface relating to the graphic effect. The security manager 352 may provide all security functions required for system security or user authentication. According to an embodiment, when the electronic device (for example, the electronic device 101) has a telephone call function, the middleware 330 may further include a telephony manager for managing a voice call function or a video call function of the electronic device.

The middleware 330 may include a middleware module that forms combinations of various functions of the above described elements. The middleware 330 may provide specialized modules according to types of operating systems in order to provide differentiated functions. Furthermore, the middleware 330 may dynamically remove some of the existing elements, or may add new elements.

The API 360 (for example, the API 145) is, for example, a set of API programming functions, and may be provided with a different configuration according to an OS. For example, in the case of Android® or iOS®, one API set may be provided for each platform, and in the case of Tizen®, two or more API sets may be provided for each platform.

The applications 370 (for example, the application programs 147) may include, for example, one or more applications that can perform functions, such as home 371, dialer 372, short message service (SMS)/multimedia message service (MMS) 373, instant message (IM) 374, browser 375, camera 376, alarm 377, contacts 378, voice dialer 379, e-mail 380, calendar 381, media player 382, album 383, clock 384, health care (for example, measure exercise quantity or blood sugar), or environment information (for example, atmospheric pressure, humidity, temperature information or the like).

According to an embodiment, the applications 370 may include an application (hereinafter, referred to as an "information exchange application" for convenience of description) supporting information exchange between the electronic device (for example, the electronic device 101) and an external electronic device (for example, the electronic device 102 or 104). The application associated with the exchange of information may include, for example, a notification relay application for transferring specific information to an external electronic device, or a device management application for managing an external electronic device.

For example, the notification relay application may include a function of transferring, to the external electronic device (for example, the electronic device 102 or 104), notification information generated from other applications of the electronic device 101 (for example, an SMS/MMS application, an e-mail application, a health management application, or an environmental information application). Furthermore, the notification relay application may, for example, receive notification information from an external electronic device and provide the received notification information to a user.

The device management application may manage (for example, install, delete, or update) at least one function of an external electronic device (for example, the electronic device 102 or 104, or the server 106) communicating with the electronic device (for example, a function of turning on/off the external electronic device itself (or some components) or a function of adjusting luminance (or a resolution) of the display), applications operating in the external electronic device, or services provided by the external electronic device (for example, a call service and a message service).

According to an embodiment, the applications 370 may include applications (for example, a health care application of a mobile medical appliance or the like) designated according to attributes of the external electronic device 102 or 104. According to an embodiment, the applications 370 may include an application received from the external electronic device (for example, the server 106, or the electronic device 102 or 104). According to an embodiment, the applications 370 may include a preloaded application or a third party application which can be downloaded from the server. Names of the elements of the program module 310, according to the above-described embodiments of the present disclosure, may change depending on the type of OS.

According to exemplary embodiments of the present disclosure, at least some of the program module 310 may be implemented in software, firmware, hardware, or a combination of two or more thereof. At least some of the program module 310 may be implemented (e.g., executed) by, for example, the processor (e.g., the processor 210). At least some of the program module 310 may include, for example, a module, a program, a routine, a set of instructions, and/or a process for performing one or more functions.

Figure 4A:
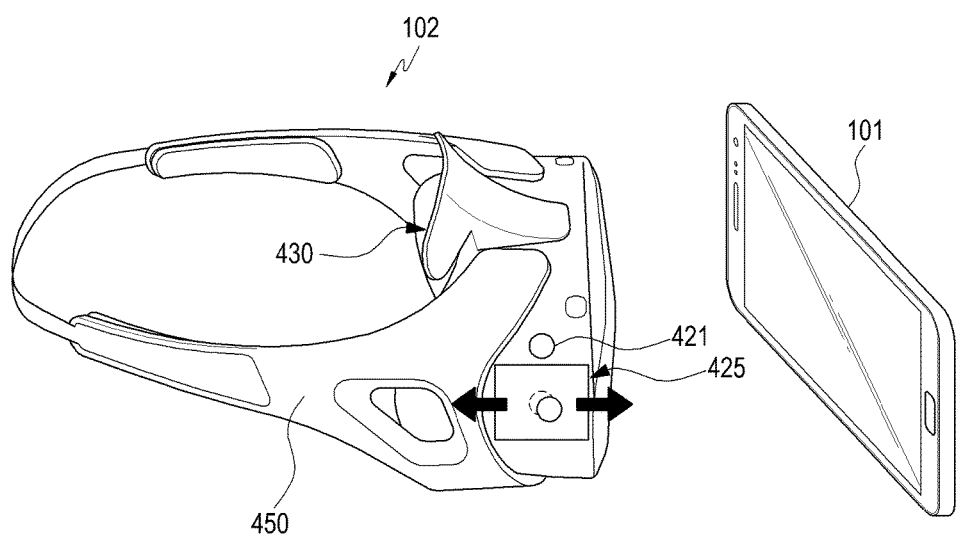
FIG. 4A illustrates a perspective view illustrating an electronic device according to an embodiment of the present disclosure.

FIG. 4A illustrates a perspective view illustrating the electronic device 101 and the electronic device 102 according to an embodiment of the present disclosure.

The electronic device 101 may include a display. The electronic device 101 may store a virtual reality application. The virtual reality application may be an application which can provide a display similar to an actual reality to the user. According to an embodiment, the virtual reality application may display a left eye image and a right eye image corresponding to each of the user's eyes based on a stereo scheme.

The electronic device 102 may be a head mounted theater (HMT) device. The HMT device may be mounted on a user's head and fixed to the user's head even though the user moves. Further, the HMT device may also fix the electronic device 101 and thus the user may view an image displayed on the electronic device 101.

The electronic device 102 according to an embodiment may include a housing 450 provided to be worn on the user's head, a blackout part 430 fixed to the housing and provided at an area corresponding to locations of the user's eyes, and at least one input button 421 provided at one area of the housing 450. The electronic device 102 may include an input pad 425 which may receive a swipe input from the user.

The user may position the user's eyes to fit closely to the blackout part 430 and, accordingly, the user may view the image by the virtual reality application provided from the electronic device 101 without any interference from external light.

The electronic device 101 may be coupled to the electronic device 102. The electronic device 101 may be connected to the electronic device 102 through a wire or wirelessly. For example, although the electronic device 101 may be connected to the electronic device 102 based on a USB, it is merely an example and it may be easily understood by those skilled in the art that there is no limitation on the connection if data transmission/reception between the two devices 101 and 102 is possible through the connection. According to another embodiment, the electronic device 101 may be simply physically coupled to the electronic device 102.

Figure 4B:
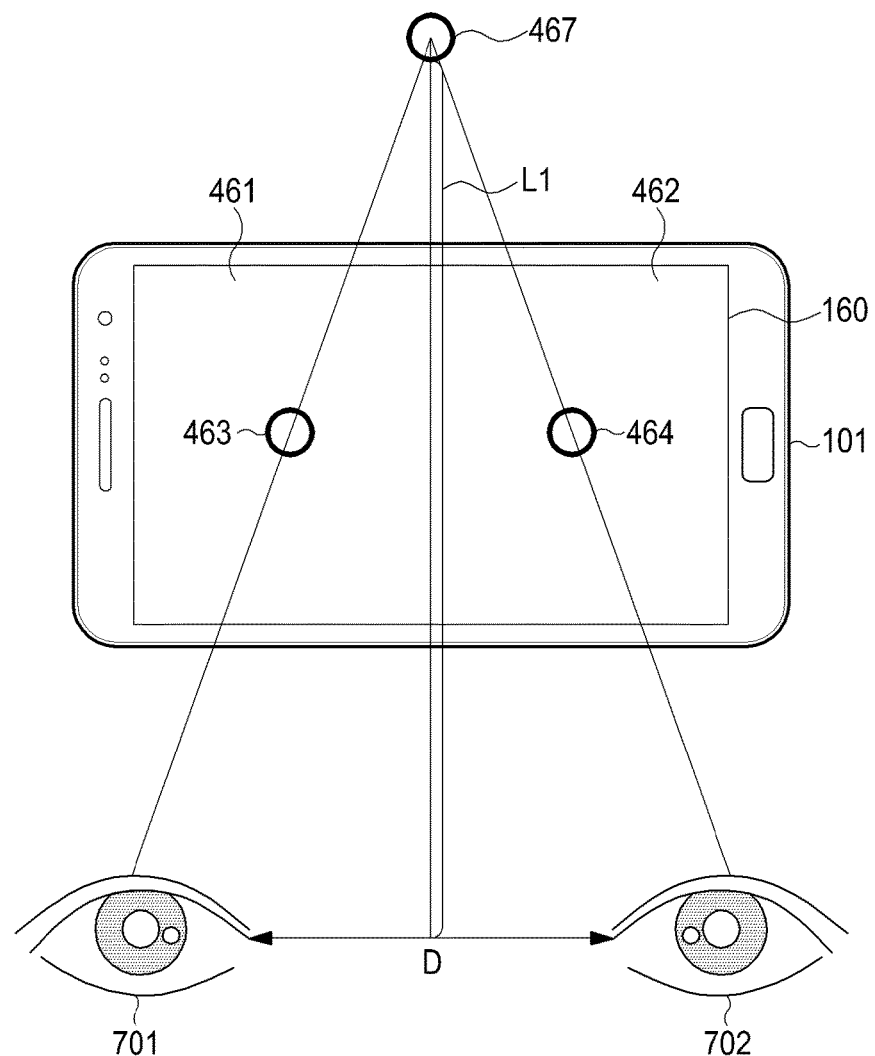
FIG. 4B illustrates displaying of the electronic device according to an embodiment.

FIG. 4B illustrates the displaying operation of the electronic device according to an embodiment.

As illustrated in FIG. 4B, the electronic device 101 may display a left eye image 461 and a right eye image 462 on the display 160. The left eye image 461 may include a first object 463 and the right eye image 462 may include a second object 464. The first object 463 may correspond to a left eye 701 and the second object 464 may correspond to a right eye 702. In FIG. 4B, an interpupillary Distance (IPD) corresponding to a distance between the left eye 701 and the right eye 702 may be D. The left eye image 461 and the right eye image 462 may correspond to the user's two eyes and may be images viewed by the user while the user feels a sense of depth. According to embodiments of the present disclosure, the left eye image 461 and the right eye image 462 may be images for the virtual reality service, and may be images configured to give a three-dimensional effect to a part of the entire screen for the virtual reality service.

The electronic device 101 may display the first object 463 and the second object 464 with a predetermined distance therebetween. The user may view as if an object image 467 exists at the intersection of a straight line passing through the left eye 701 and the first object 463 and a straight line passing through the right eye 702 and the second object 464. For example, the user may view as if the object image exists at a position spaced apart from the user by L1.

According to an embodiment, the electronic device 101 may display the first object 463 and the second object 464, which have a loop shape.

Figure 4C:
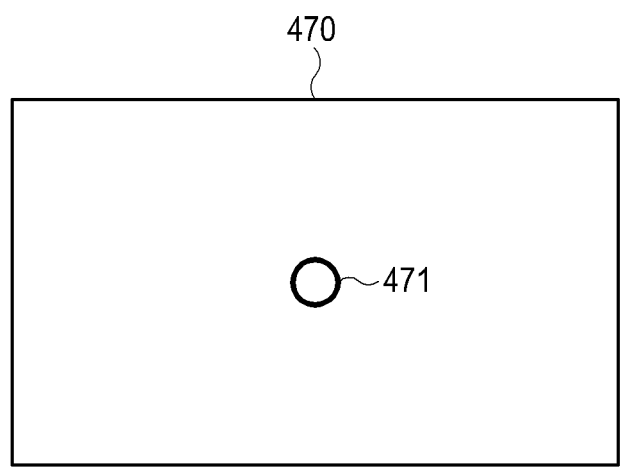
FIG. 4C illustrates a conceptual diagram of a screen viewed by the user.

FIG. 4C illustrates a conceptual diagram of the screen viewed by the user. As illustrated in FIG. 4C, the user may view the screen including a loop-shaped image 471.

Meanwhile, although FIGS. 4A to 4C illustrate that the electronic device 101 is separated from the electronic device 102, which the user wears, it is merely an example and the electronic device 101 may be implemented to be integral with the electronic device 102.

Figure 5A:
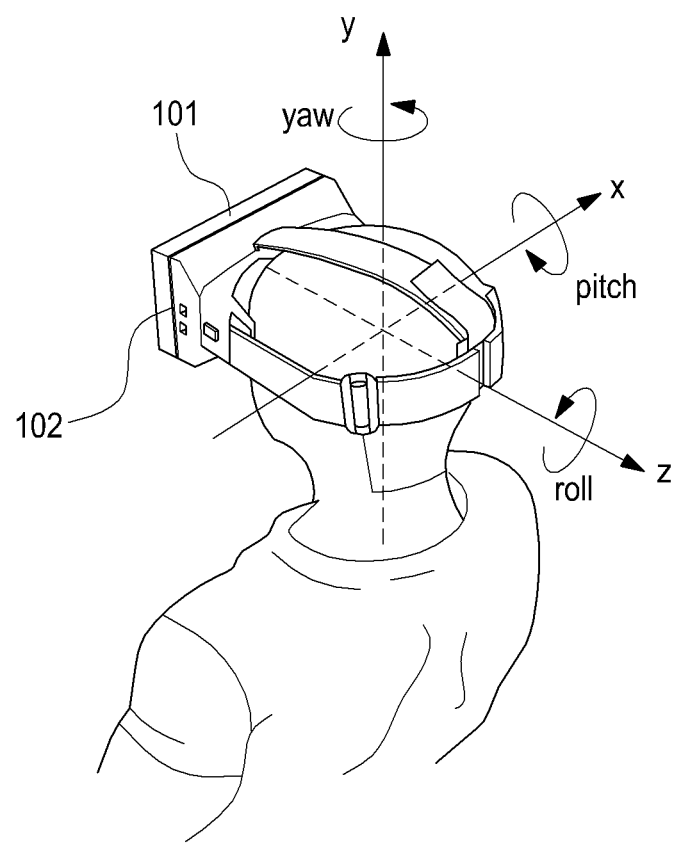
FIG. 5A illustrates a perspective view illustrating a user wearing an HMT device.

FIG. 5A illustrates a perspective view illustrating the user wearing the HMT device.

The user may wear the housing on the head. Further, the electronic device 101 may be coupled to the electronic device 102, and the user may view an image displayed on the display of the electronic device 101.

The electronic device 101 may display a left eye image and a right eye image on respective left and right parts of the display. The left eye image may be incident to the user's left eye and the right eye image may be incident to the user's right eye. For example, the left eye image and the right eye image may be incident to the user's entire field of view through both eyes. The user may receive a virtual reality service by viewing the images incident to both eyes.

The virtual reality application executed by the electronic device 101 may display a binocular image on the display. The virtual reality application may change and display the binocular image according to a motion (yaw, pitch, or roll) of the user or the electronic device 102.

The electronic device 102 may receive a command from the user by at least one of the input button 421 and/or the input pad 425. For example, the electronic device 101 may acquire a focus control command or a manipulation command from the electronic device 102. According to another embodiment, the user may directly input the focus control command or the manipulation command into the electronic device 101.

For example, when the user inputs a swipe gesture in a first direction of the input pad 425, the electronic device 101 may execute a control command corresponding to the swipe gesture.

FIGS. 5B to 5E illustrate conceptual diagrams illustrating screen switching of the electronic device according to embodiments of the present disclosure.

Figure 5B:
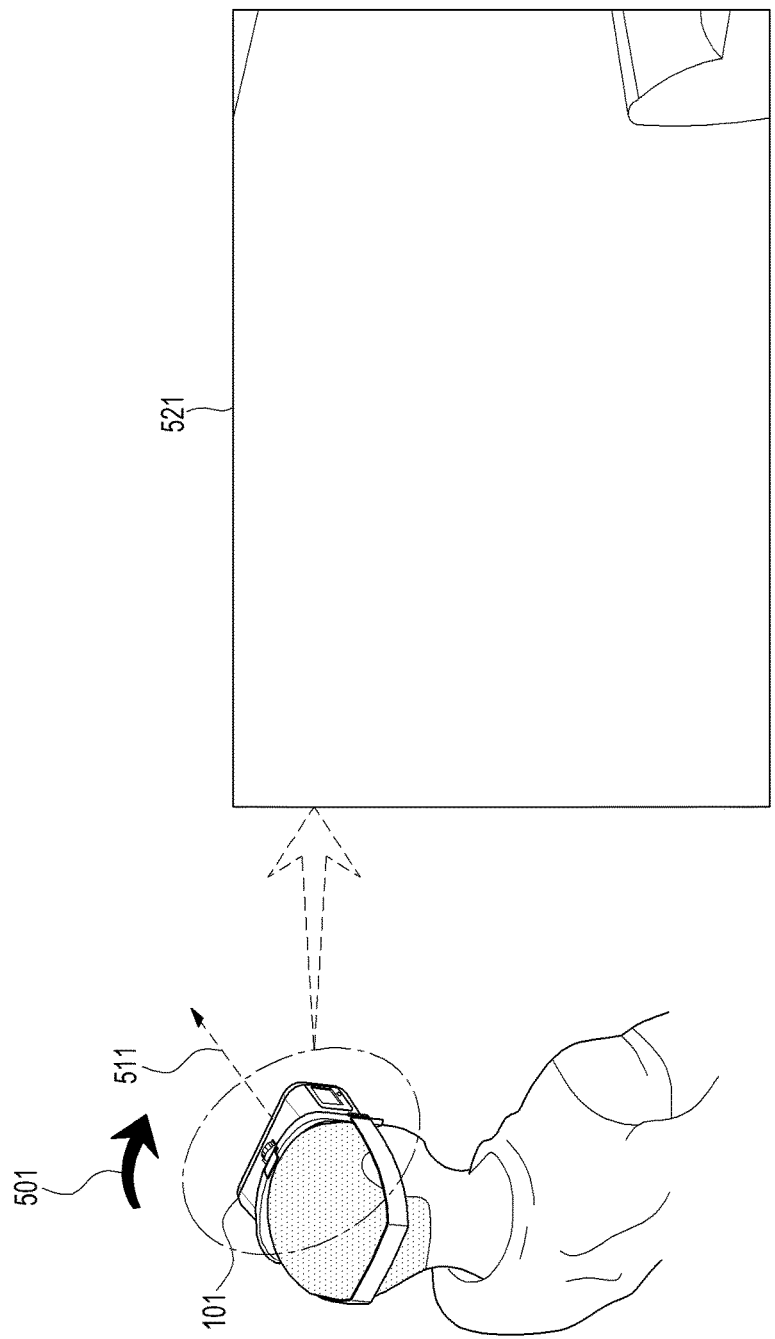
FIGS. 5B to 5E illustrate conceptual diagrams illustrating screen switching of the electronic device according to various embodiments of the present disclosure.
Figure 5C:
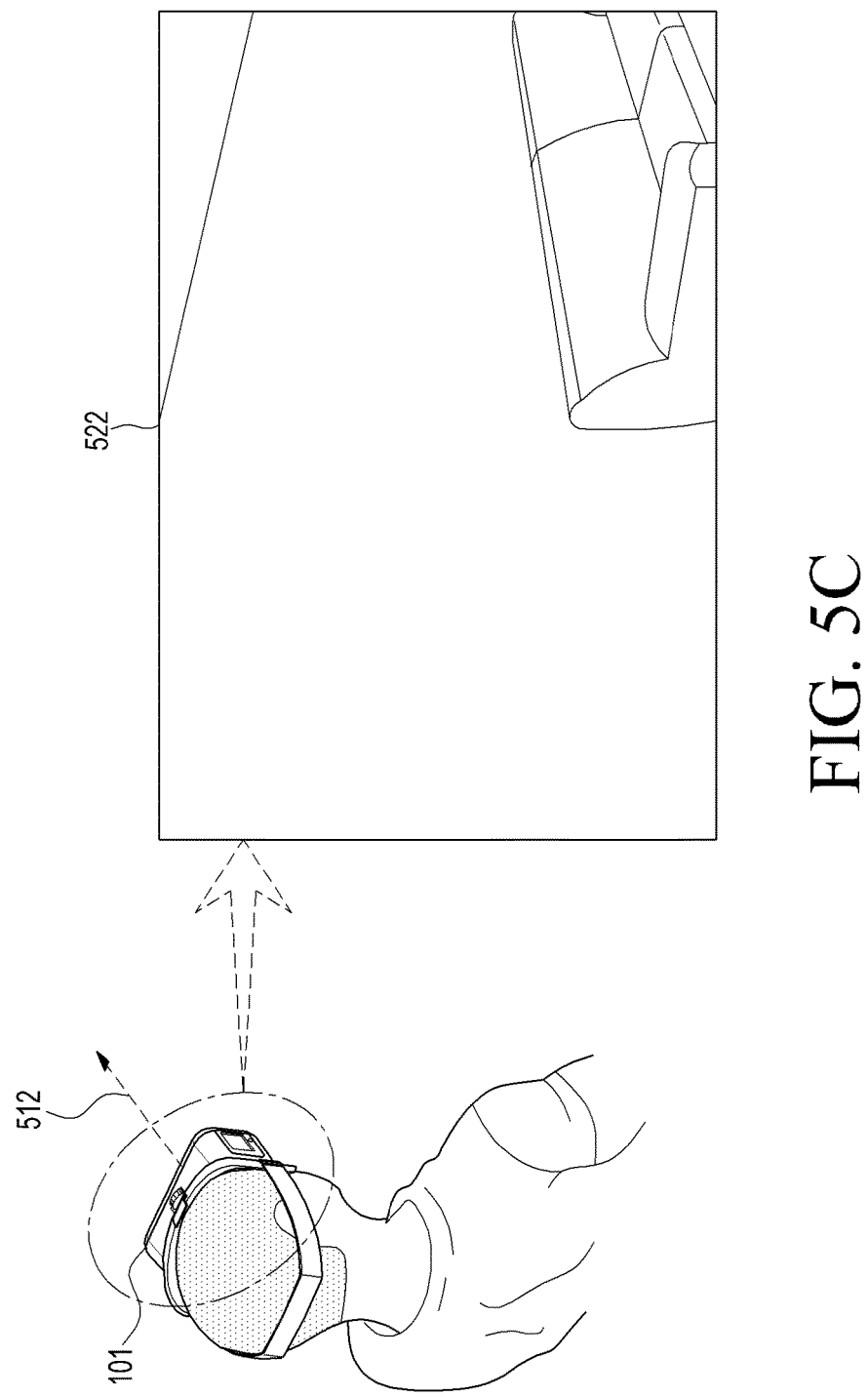
Figure 5D:
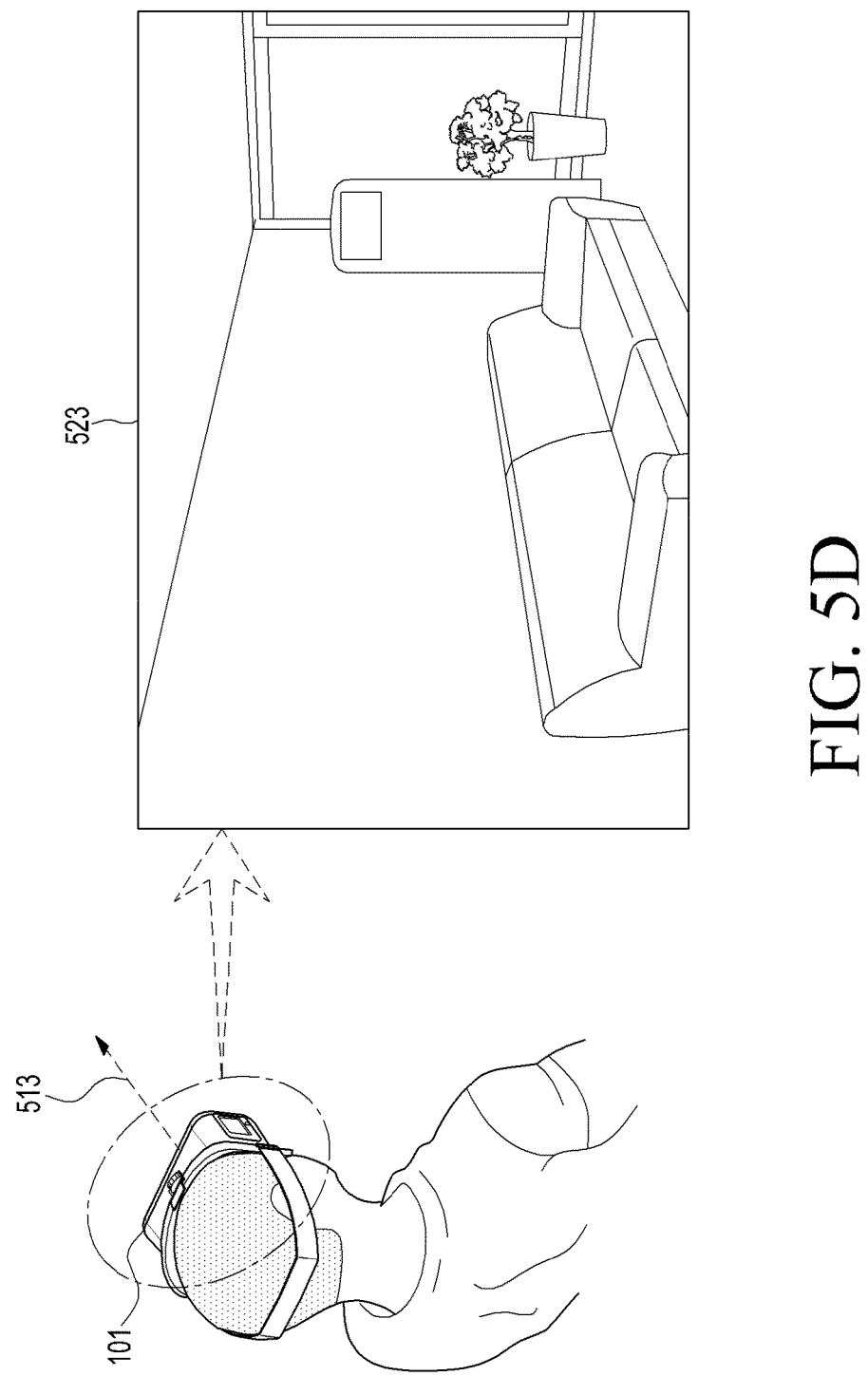
Figure 5E:
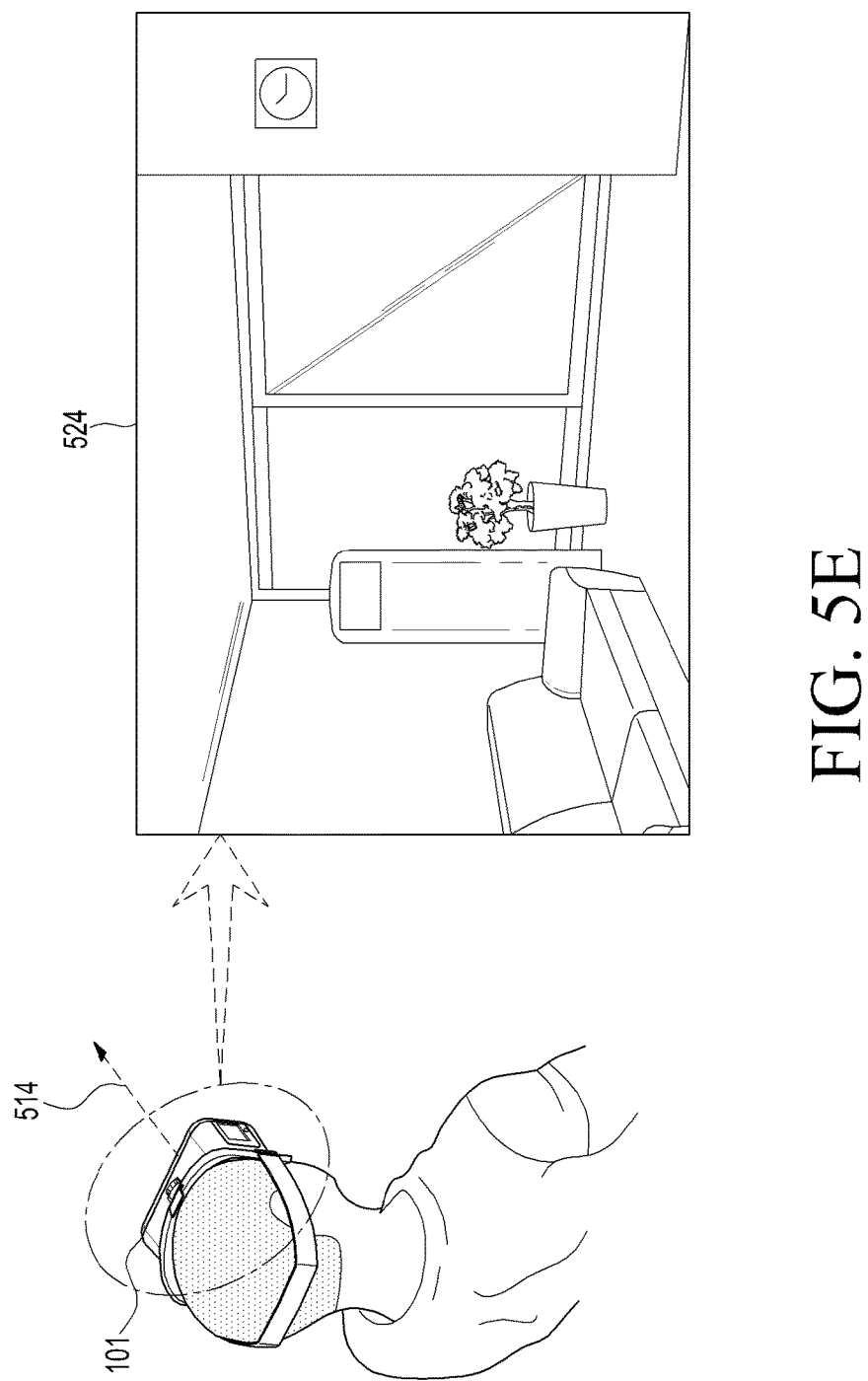

As illustrated in FIG. 5B, the user may look in a first direction 511 in a state where the user wears the electronic device 101. The electronic device 101 may display a left eye image and a right eye image for a first virtual screen 521 to allow the user to view the first virtual screen 521. The first virtual screen 521 may be a screen corresponding to a part of the entire screen configured in the virtual reality service. Meanwhile, the user may turn the user's head in a right direction 501, and the electronic device 101 may sense the rotation in the right direction 501. As illustrated in FIGS. 5C to 5E, the user may turn the user's head in a second direction 512, a third direction 513, and a fourth direction 514 from the first direction 511. The electronic device 101 may sense the rotation 501 in the fourth direction 514 from the first direction 511. The electronic device 101 may change and display the first virtual screen 521 in response to the rotation 501. For example, the electronic device 101 may display a second virtual screen 522 in accordance with the second direction 512, a third virtual screen 523 in accordance with the third direction 513, and a fourth virtual screen 524 in accordance with the fourth direction 514. More specifically, the electronic device 101 may display the left eye image and the right eye image for displaying the virtual screens, respectively. Each of the first virtual screen 521 to the fourth virtual screen 524 may be a partial screen of the entire screen for the virtual reality service. As illustrated in FIGS. 5B to 5E, the second virtual screen 522 may be a screen for a foreground arranged relatively on the right side of the first virtual screen 521, the third virtual screen 523 may be a screen for a foreground arranged relatively on the right side of the second virtual screen 522, and the fourth virtual screen 524 may be a screen for a foreground arranged relatively on the right side of the third virtual screen 523. Accordingly, as the user turns the user's head in a right direction, the user may sequentially view the foregrounds arranged relatively on the right side.

Figure 6A:
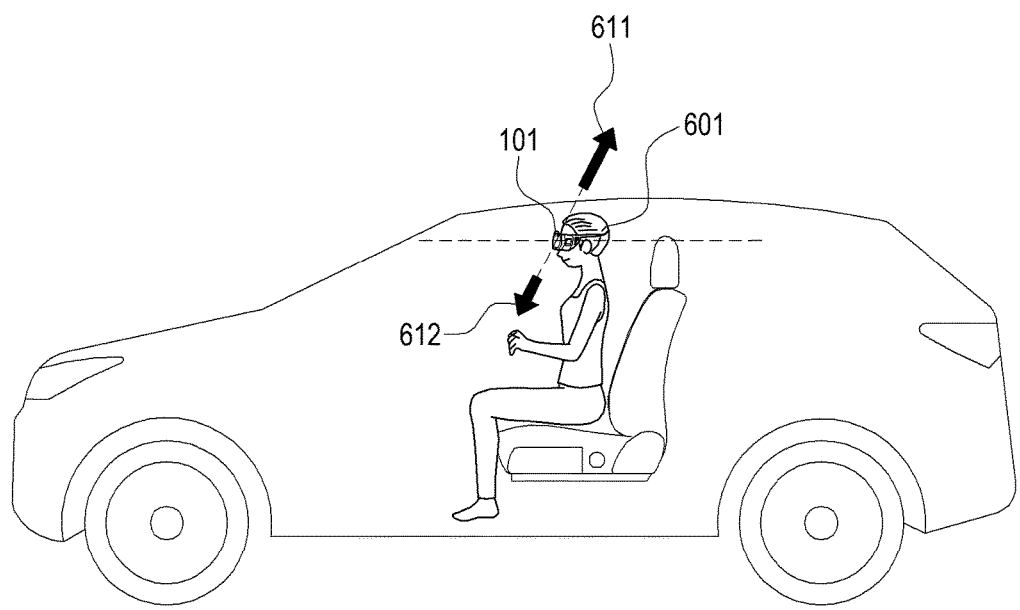
FIGS. 6A to 6C illustrate conceptual diagrams illustrating an operation of the electronic device according to various embodiments of the present disclosure.
Figure 6B:
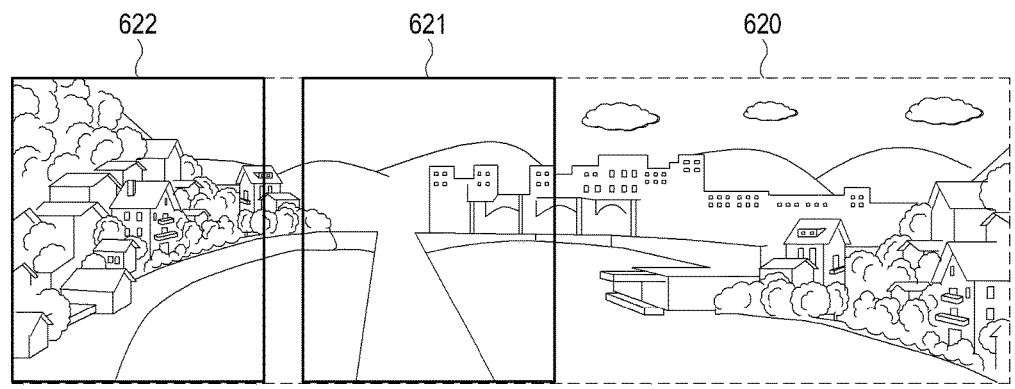
Figure 6B:
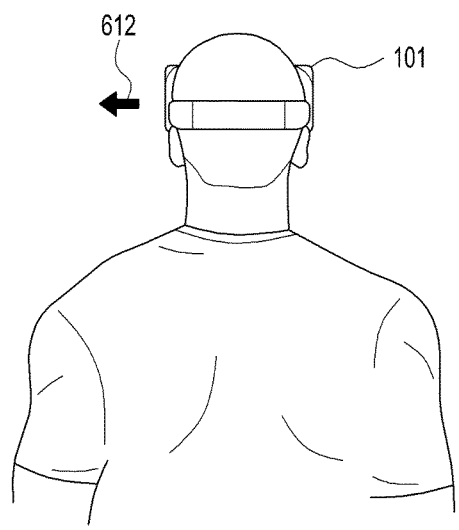
Figure 6C:
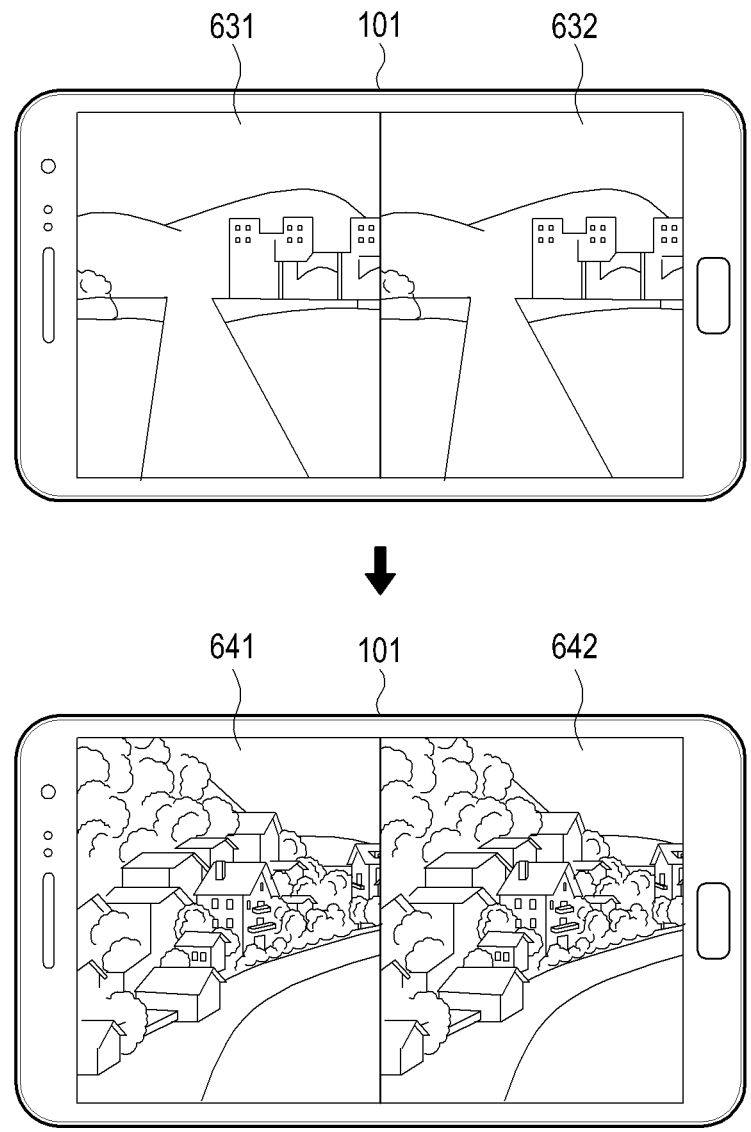

FIGS. 6A to 6C illustrate conceptual diagrams illustrating an operation of the electronic device according to embodiments of the present disclosure.

As illustrated in FIG. 6A, a user 601 may board a transportation means such as a car while wearing the electronic device 101. In this case, the transportation means may accelerate in a first direction. For example, it is assumed that the transportation means accelerates with an acceleration 611 with a vector having coordinates (a1, b1, c1). (a1, b1, c1) may be coordinates based on a predetermined point of a non-inertial frame for the transportation means, and the components may indicate sizes and directions of the x, y, and z axis components of the acceleration, respectively. For example, each of a1, b1, and c1 may have a positive value or a negative value. Meanwhile, the electronic device 101 may be included in an inertial frame corresponding to the transportation means and, accordingly, an inertial force 612 may be applied to the electronic device 101. The inertial force 612 may be applied in a direction opposite to the first direction. Meanwhile, an inertial acceleration of the inertial force 612 may have the same absolute value as that of the acceleration of the transportation means. That is, the inertial acceleration of the inertial force 612 may have a vector value of (−a1, −b1, −c1). Meanwhile, although FIG. 6A illustrates that the linear inertial acceleration is applied to the electronic device 101, it is merely an example and a rotational inertia angular acceleration may be applied to the electronic device 101.

As illustrated in FIG. 6B, the electronic device 101 may display a partial image 621 of a total image 620 such as a panorama on the display. For example, as illustrated in FIG. 6C, the electronic device 101 may display a left eye image 631 corresponding to a first image 621, which is a partial image, on a left half side of the display and display a right eye image 632 corresponding to the partial image 621 on a right half side of the display.

It is assumed that the user is viewing the first image 621 without any movement. Since the user is not moving while wearing the electronic device 101, the electronic device 101 should maintain displaying of the left eye image 631 and the right eye image 632 corresponding to the first image 621. However, as described above, the electronic device 101 may receive the inertial force 612 in the direction opposite to the first direction. The motion information sensing module of the electronic device 101 may sense the inertial force 612 as a motion of the electronic device 101 by the user. That is, the electronic device 101 may change the displayed images 631 and 632 in accordance with the inertial force 612. The electronic device 101 may determine a second image 622 to be changed in the total image 620 by the inertial force 612. The electronic device 101 may determine the second image 622 based on the direction and size of the inertial force 612. The electronic device 101 may display a left eye image 641 and a right eye image 642 corresponding to the second image 622. Accordingly, even though the user 601 desires to view the first image 621, the user views the second image 622 due to the inertial force 612.

Figure 7:
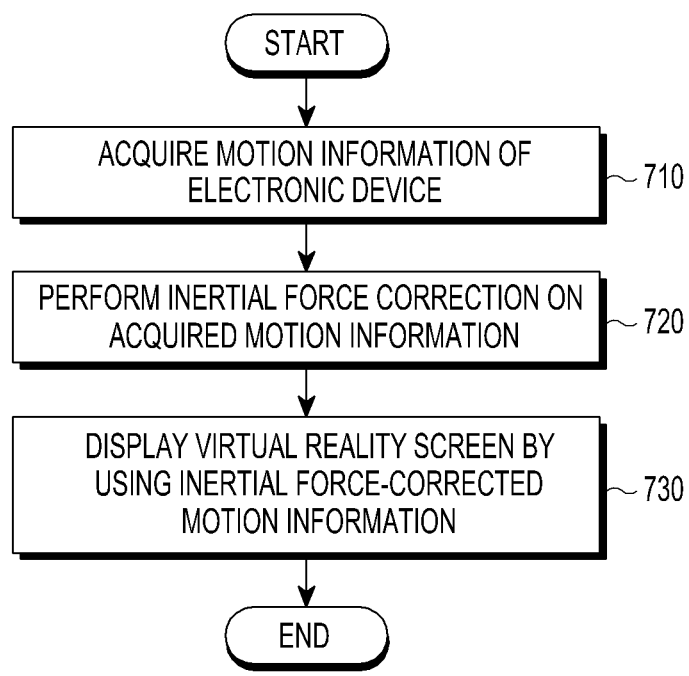
FIG. 7 illustrates a flowchart illustrating a control method of the electronic device according to various embodiments of the present disclosure.

FIG. 7 illustrate a flowchart illustrating a control method of the electronic device according to embodiments of the present disclosure.

In operation 710, the electronic device 101 may acquire motion information of the electronic device 101. The electronic device 101 may include sensors such as a linear acceleration sensor, a gyro sensor, and/or a geomagnetic sensor, which may sense various linear accelerations, rotation angle accelerations, and/or orientation information of the electronic device. The electronic device 101 may acquire motion information of the electronic device 101 based on output values from the various sensors. For example, the electronic device 101 may acquire a linear acceleration of the electronic device 101 based on the output value from the linear acceleration sensor. The electronic device 101 may acquire a rotation angle acceleration of the electronic device 101 based on the output value from the gyro sensor. The electronic device 101 may acquire a motion in orientation information on the electronic device 101 based on the output value from each of the gyro sensor and the geomagnetic sensor.

In operation 720, the electronic device 101 may perform an inertial force correction on the acquired motion information. The electronic device 101 may remove the inertial force component from the acquired motion information and, accordingly, acquire the inertial force-corrected motion information. According to an embodiment, the electronic device 101 may acquire the inertial force information and perform the inertial force correction. According to an embodiment, the electronic device 101 may receive inertial force information from another electronic device including the sensor and perform the inertial force correction by using the received inertial force information. According to an embodiment, the electronic device 101 may generate an inverse vector in accordance with the acquired inertial force information and acquire the inertial force-corrected motion information by adding the inverse vector and the acquired motion information. According to an embodiment, the electronic device 101 may measure a biometric signal and perform the inertial force correction by using the measured biometric signal. According to an embodiment, the electronic device 101 may determine whether an absolute value of the motion information is included in a preset range and perform the inertial force correction according to a result of the determination. According to an embodiment, the electronic device 101 may perform the inertial force correction by removing a linear component of the motion information. According to an embodiment, the electronic device 101 may photograph an external environment and perform the inertial force correction by using the photographed image. According to an embodiment, the electronic device 101 may perform the inertial force correction based on whether orientation information of the electronic device 101 is changed. The inertial force correction according to the embodiments will be described below in more detail.

In operation 730, the electronic device 101 may display a virtual reality screen by using the inertial force-corrected motion information. That is, the electronic device 101 may display the virtual reality screen by using motion information acquired from the user's intention. Accordingly, the user may view the intended virtual reality screen while the transportation means in which the user has boarded accelerates.

Meanwhile, the other electronic device may be included in, for example, an airplane. In this case, the other electronic device may transmit information such as an acceleration, altitude, and/or terrestrial magnetism to the electronic device 101. The electronic device 101 may perform the correction based on the received information such as the acceleration, altitude, and/or terrestrial magnetism.

Figure 8A:
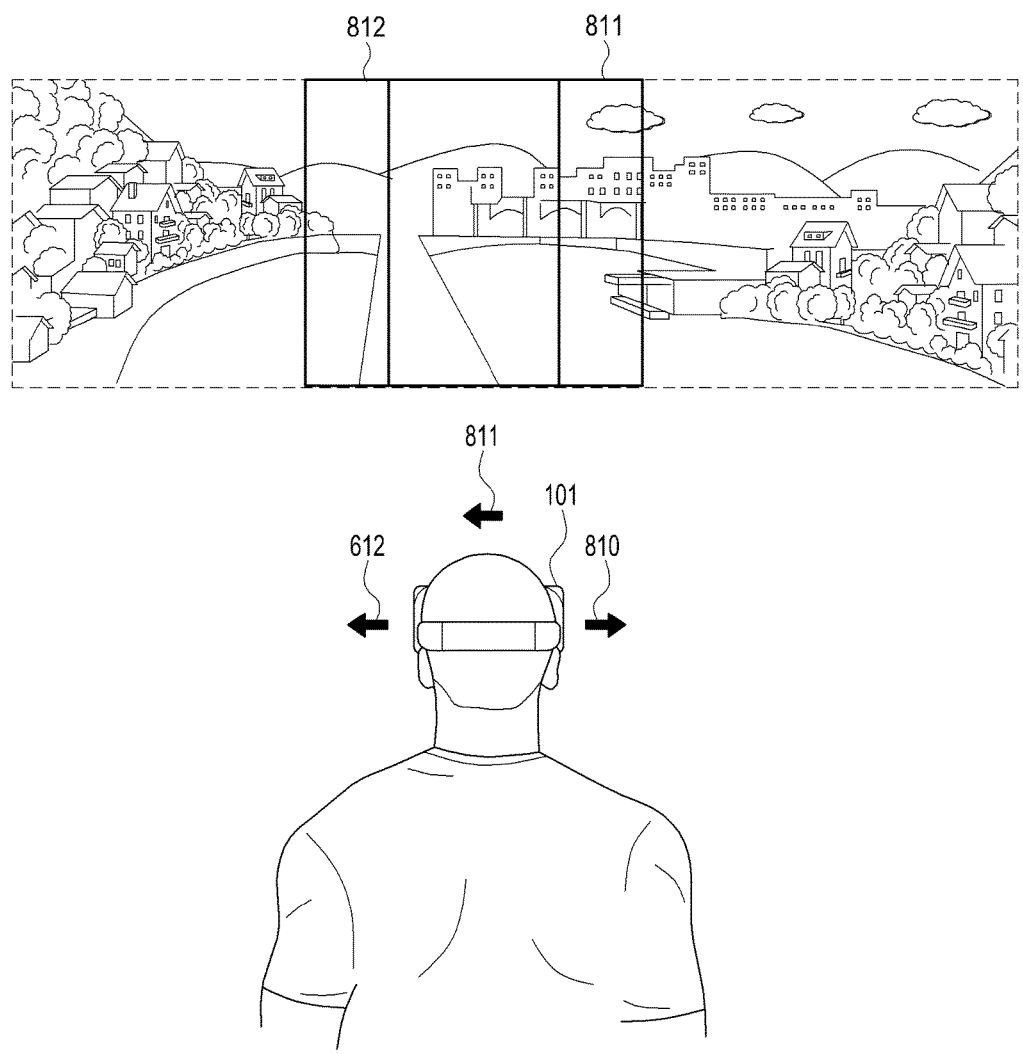
FIGS. 8A to 8C illustrate conceptual diagrams illustrating an operation of the electronic device according to various embodiments of the present disclosure.
Figure 8B:
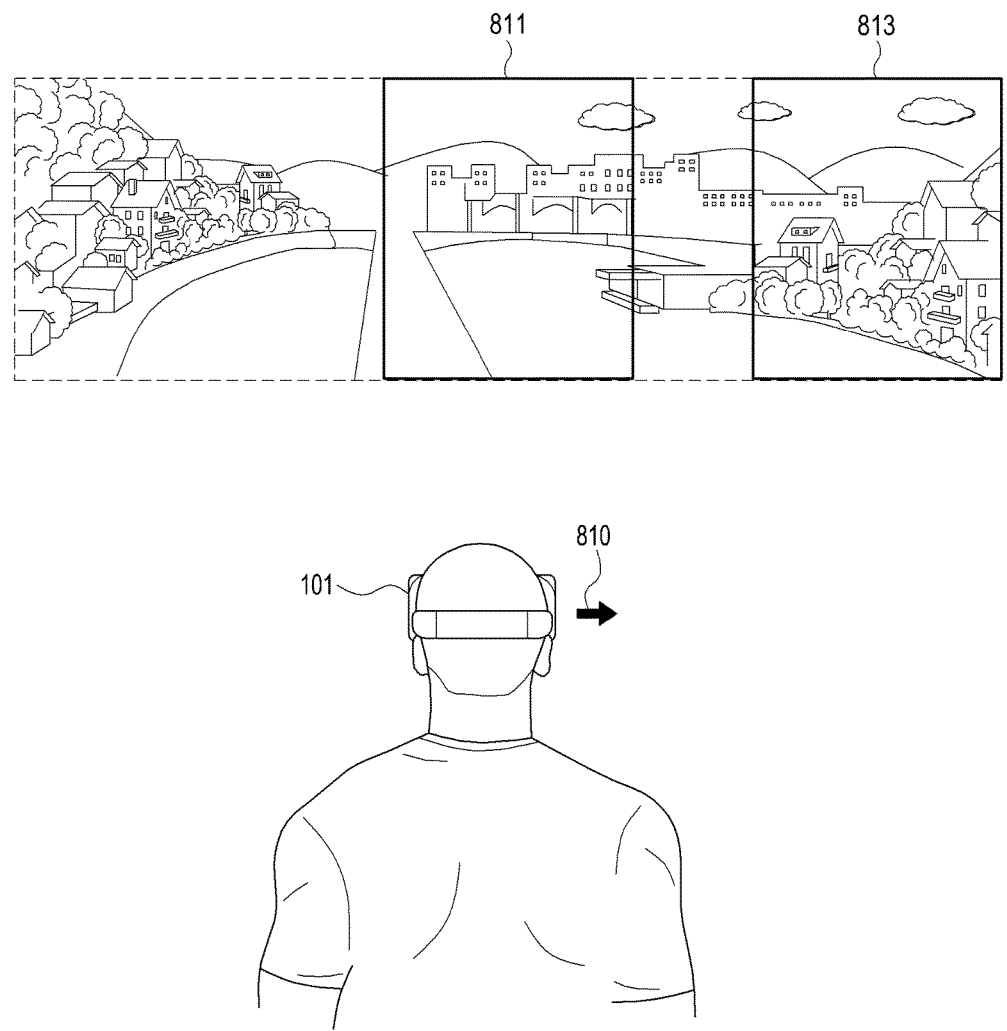
Figure 8C:
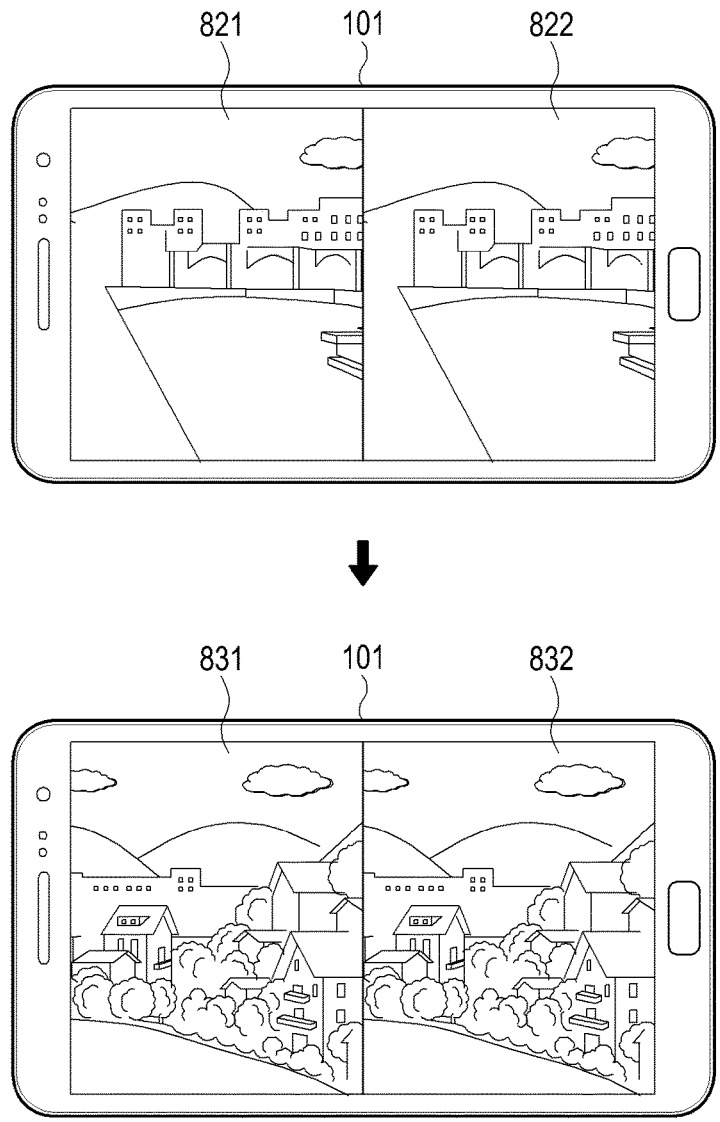

FIGS. 8A to 8C illustrate conceptual diagrams illustrating an operation of the electronic device according to embodiments of the present disclosure.

In FIG. 8A, it is assumed that the user 601 boards the transportation means like in FIG. 6A. Further, the electronic device 101 may receive the inertial force 612 like in FIG. 6A. As illustrated in FIG. 6A, the inertial acceleration corresponding to the inertial force 612 may have the vector value of (−a1, −b1, −c1). Meanwhile, the user may turn the user's head to the right while wearing the electronic device 101. Accordingly, the electronic device 101 may sense a motion 810 of the electronic device 101 and acquire motion information. Here, it is assumed that an acceleration corresponding to the motion 810 is (a2, b2, c2). Accordingly, the acceleration corresponding to the motion information of the electronic device 101, which the electronic device 101 acquires, may be (a2-a1, b2-b1, c2-c1) generated by adding the inertial acceleration (−a1, −b1, −c1) and the acceleration (a2, b2, c2) corresponding to the motion 810. (a2-a1, b2-b1, c2-c1) is named an added acceleration 811. For example, the added acceleration 811 may be the left side from the user.

The electronic device 101 may display a left eye image and a right eye image corresponding to a first image 811. Meanwhile, the electronic device 101 may display a left eye image and a right eye image corresponding to a second image 812 in accordance with the added acceleration 811. Accordingly, even though the user turns the user's head relatively to the right, the user views the second image 812 arranged relatively on the left side of the first image 811.

The electronic device 101 according to embodiments of the present disclosure may ignore the inertial acceleration corresponding to the inertial force 612 and adopt the acceleration corresponding to a motion 810 actually intended by the user as motion information. The electronic device 101 may acquire inertial force-corrected motion information by performing the inertial force correction through the various methods and, accordingly, display a third image 813 corresponding to the motion 810. For example, as illustrated in FIG. 8C, the electronic device 101 may change a left eye image 821 and a right eye image 822 corresponding to the first image 811 and display a left eye image 831 and a right eye image 832 corresponding to the third image 813.

In the above description, the electronic device 101 may perform the inertial force correction on the sensed motion information and display the screen based on the inertial force-corrected motion information. Hereinafter, various inertial force correction methods performed by the electronic device 101 will be described in more detail.

Figure 9:
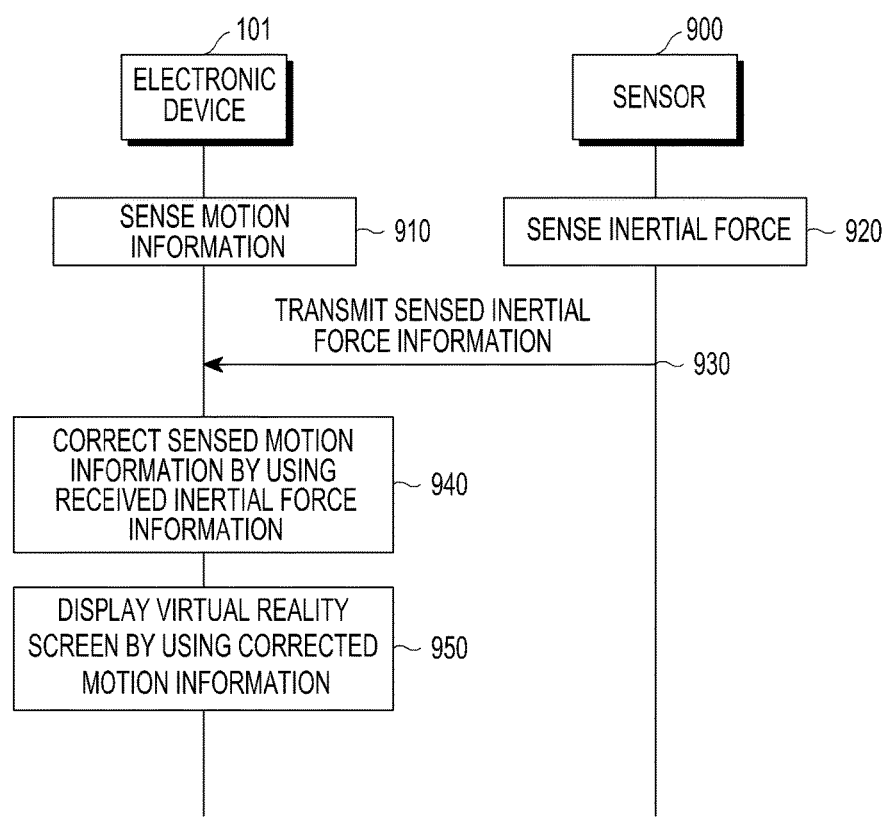
FIG. 9 illustrates a flowchart illustrating an inertial force correction method according to various embodiments of the present disclosure.

FIG. 9 illustrate a flowchart illustrating an inertial force correction method according to embodiments of the present disclosure.

In operation 910, the electronic device 101 may sense motion information. The electronic device 101 may include sensors such as a linear acceleration sensor, a gyro sensor, and a geomagnetic sensor, which may sense various linear accelerations, rotation angle accelerations, or orientation information of the electronic device. The electronic device 101 may acquire motion information of the electronic device 101 based on output values from the various sensors.

In operation 920, a sensor 900 may sense an inertial force. The sensor 900 may be physically separated from the electronic device 101 and may be included in an inertial frame corresponding to a transportation means. The sensor 900 may be independent from an operation for moving the electronic device 101 by the user. For example, when the user performs an operation of rotating the head while wearing the electronic device 101, a location of the sensor 900 is not influenced by the operation by the user. The sensor 900 may sense the inertial force by the acceleration of the transportation means. The sensor 900 may include sensors such as a linear acceleration sensor, a gyro sensor, and/or a geomagnetic sensor which may sense various linear accelerations, rotation angle accelerations, and/or orientation information of the electronic device. The sensor 900 may sense the inertial force based on output values from the various sensors.

In operation 930, the sensor 900 may transmit the sensed inertial force information to the electronic device 101. The sensor 900 may transmit the sensed inertial force information to the electronic device 101 through wired or wireless communication.

In operation 940, the electronic device 101 may correct the sensed motion information by using the received inertial force information. The electronic device 101 may perform the inertial force correction by removing the inertial force component from the sensed motion information. The electronic device 101 may perform the inertial force correction by adding an inverse vector of the inertial force information and the sensed motion information. For example, in embodiments of the FIGS. 8A and 8B, accelerations corresponding to the sensed motion information may be (a2-a1, b2-b1, c2-c1). Further, the sensor 900 may sense the inertial acceleration of (−a1, −b1, −c1). The electronic device 101 may receive the inertial acceleration of (−a1, −b1, −c1) from the sensor 900. The electronic device 101 may acquire the acceleration of (a2, b2, c2) of the corrected motion information by adding the inverse vector (a1, b1, c1) of the inertial acceleration and the acceleration (a2-a1, b2-b1, c2-c1) corresponding to the sensed motion information.

In operation 950, the electronic device 101 may display a virtual reality screen by using the corrected motion information. Accordingly, as illustrated in FIG. 8C, the electronic device 101 may display the left eye image 831 and the right eye image 832 corresponding to the acceleration (a2, b2, c2) of the corrected motion information.

Figure 10:
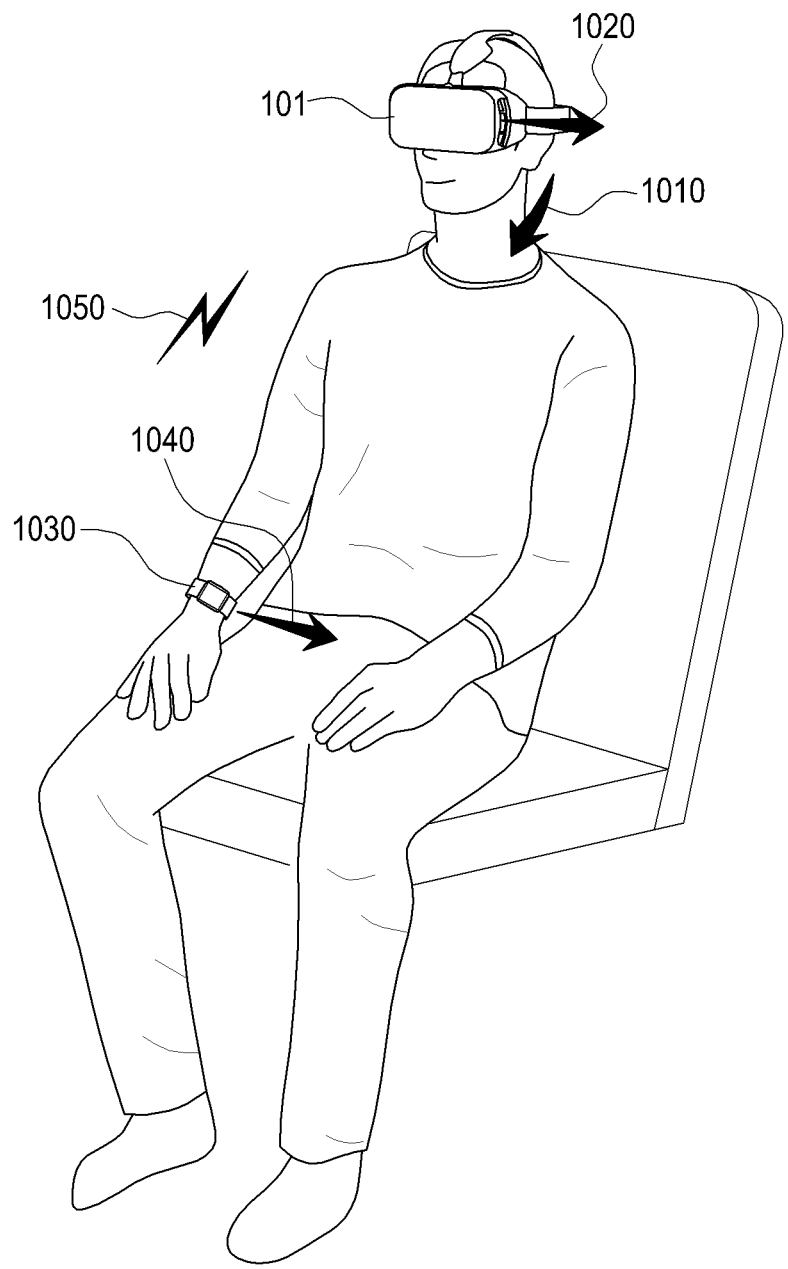
FIG. 10 illustrates a conceptual diagram illustrating the electronic device and another electronic device according to various embodiments of the present disclosure.

FIG. 10 illustrate a conceptual diagram illustrating the electronic device and another electronic device according to embodiments of the present disclosure.

As illustrated in FIG. 10, the user may board a transportation means while wearing the electronic device 101. Further, the user may wear another electronic device 1030 on the user's wrist. Although the other electronic device 1030 is illustrated as a wristwatch-type wearable electronic device, the other electronic device 1030 is not limited to the wristwatch-type wearable electronic device if the other electronic device 1030 is a device which is physically separated from the electronic device 101 and who's location is not influenced by a user's motion 1010. The user, the electronic device 101, and the other electronic device 1030 may be included in the same inertial frame.

Meanwhile, the transportation means may accelerate and, accordingly, the inertial force may be applied to all objects within the transportation means, that is, the user, the electronic device 101, and the other electronic device 1030. For example, a first inertial force 1020 may be applied to the electronic device 101 and a second inertial force 1040 may be applied to the other electronic device 1030. The first inertial force 1020 and the second inertial force 1040 may be proportional to masses of the electronic device 101 and the other electronic device 1030, respectively. The inertial acceleration corresponding to the first inertial force 1020 and the acceleration force corresponding to the second inertial force 1030 may be the same.

The user may rotate the user's head in a first direction as indicated by reference numeral 1010. Accordingly, the electronic device 101 may sense a result of a sum of motion information corresponding to the rotation 1010 in the first direction and motion information corresponding to the first inertial force 1020. A location of the other electronic device 1030 is not influenced by the user's motion, that is, the rotation 1010. Accordingly, the other electronic device 1030 may sense the second inertial force 1040. The other electronic device 1030 may transmit information on the second inertial force 1040 to the electronic device 101 as indicated by reference numeral 1050. The information on the second inertial force 1040 may be the inertial acceleration or an inverse vector of the inertial acceleration. The electronic device 101 may acquire inertial force-corrected motion information by adding the inverse vector of the inertial acceleration and the acceleration of the sensed motion information.

Meanwhile, the other electronic device 1030 may be implemented in the form fixed to the transportation means as well as that separately worn by the user in the embodiment. For example, the user may fix the other electronic device 1030 to the inertial frame of the transportation means. Alternatively, the other electronic device 1030 may be included in the transportation means. For example, the transportation means may include a sensor that may sense motion information of the transportation means and a communication module that may transmit the sensed motion information of the transportation means. In this case, the electronic device 101 may receive the motion information of the transportation means from the transportation means and perform a inertial force correction by using the motion information. When the electronic device 101 receives the motion information of the transportation means, the electronic device 101 may acquire the inertial force-corrected motion information by adding the acceleration corresponding to the motion information of the transportation means and the acceleration corresponding to the sensed motion information of the electronic device 101 without using the inverse vector. This results from the fact that the motion information of the transportation means and the inertial force have completely opposite directions.

Figure 11A:
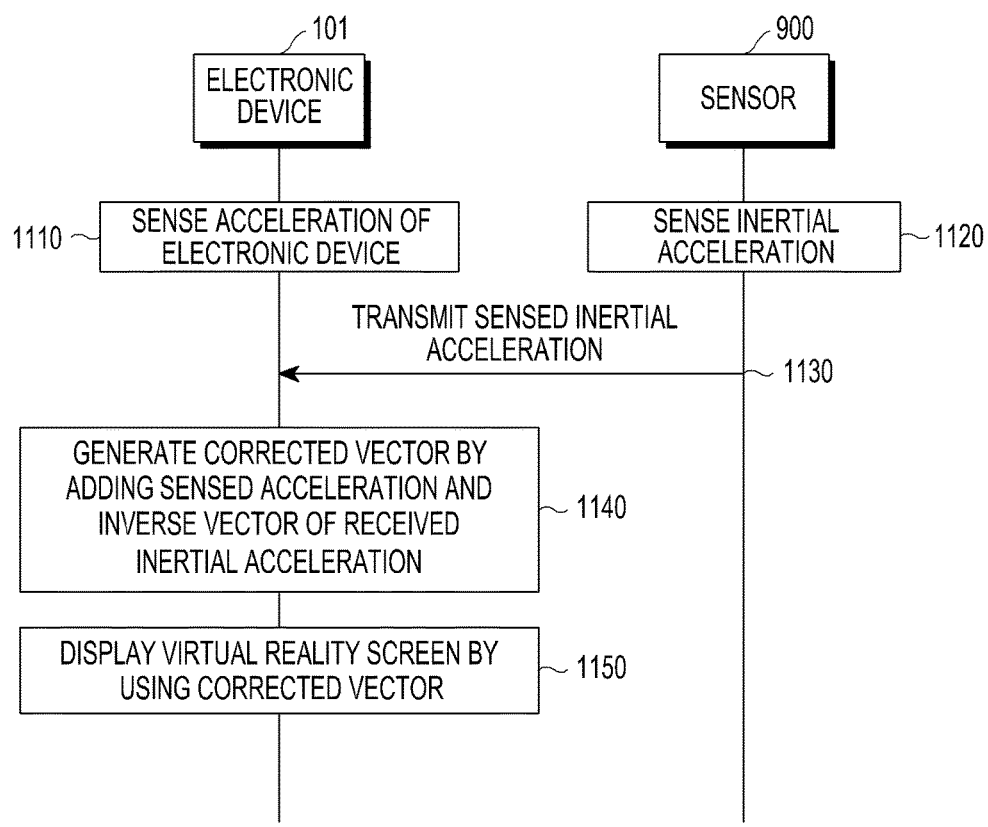
FIGS. 11A and 11B illustrate flowcharts illustrating a control method of the electronic device according to various embodiments of the present disclosure.
Figure 11B:
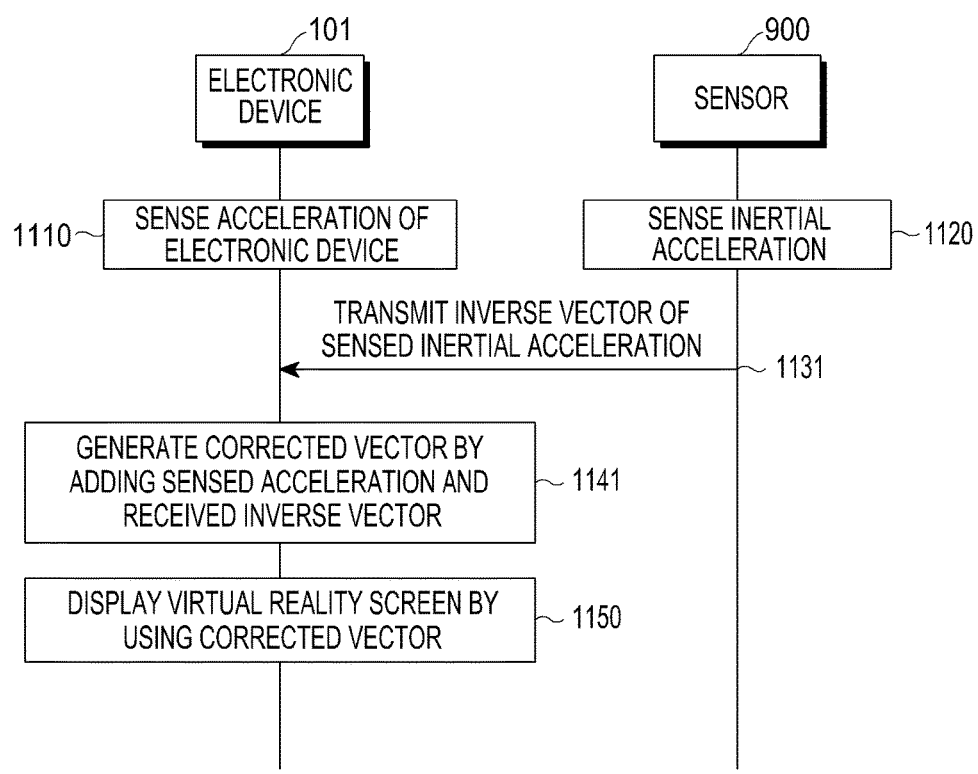

FIGS. 11A and 11B illustrate flowcharts illustrating a control method of the electronic device according to embodiments of the present disclosure.

In operation 1110, the electronic device 101 may sense an acceleration of the electronic device 101. In operation 1120, another electronic device may sense an inertial acceleration. In operation 1130, the other electronic device may transmit the sensed inertial acceleration to the electronic device 101. In operation 1140, the electronic device 101 may generate a corrected vector by adding the sensed acceleration and an inverse vector of the received inertial acceleration. The corrected vector may be an acceleration that corresponds to a user's motion. In operation 1150, the electronic device 101 may display a virtual reality screen by using the corrected vector.

Meanwhile, on contrary to FIG. 11A, the other electronic device may transmit the inverse vector of the sensed inertial acceleration in an embodiment of FIG. 11B. That is, the other electronic device may generate and transmit the inverse vector of the inertial acceleration. The other electronic device may transmit the inverse vector of the inertial acceleration in operation 1131, and the electronic device 101 may generate the corrected vector by adding the sensed acceleration and the received inverse vector in operation 1141.

Figure 12:
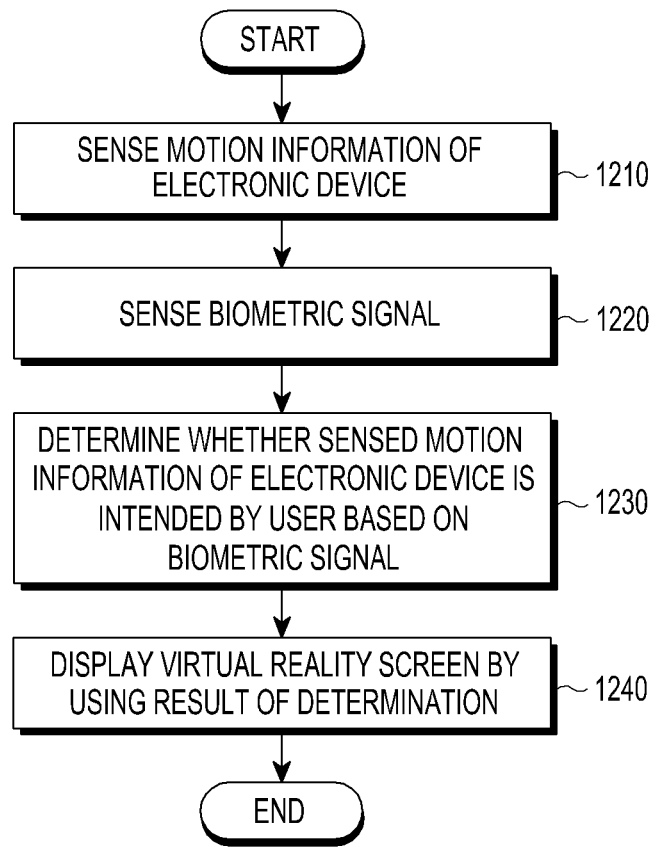
FIG. 12 illustrates a flowchart illustrating a control method of the electronic device according to various embodiments of the present disclosure.
Figure 13A:
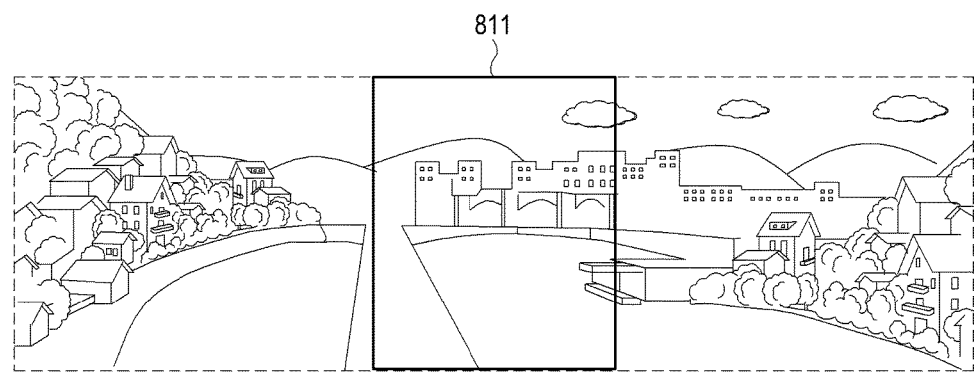
FIGS. 13A and 13B are conceptual diagrams illustrating an inertial correction using a biometric signal according to various embodiments of the present disclosure.
Figure 13A:
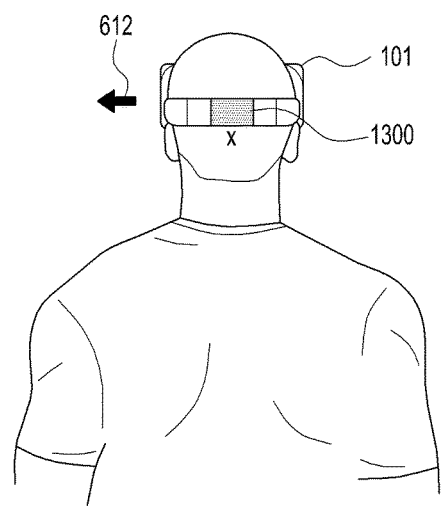
Figure 13B:
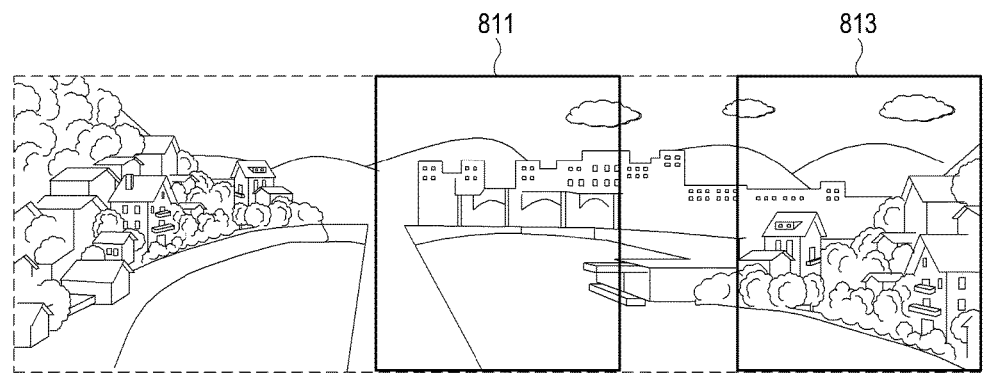
Figure 13B:
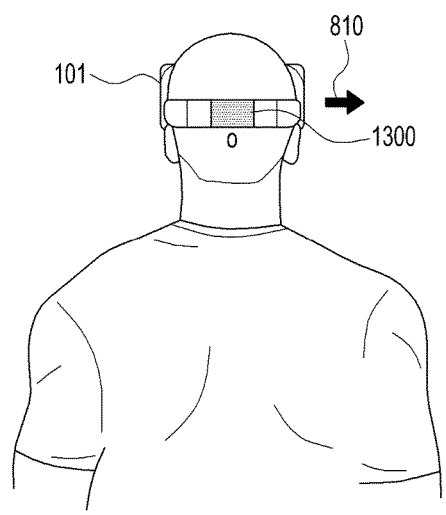

FIG. 12 illustrate a flowchart illustrating a control method of the electronic device according to embodiments of the present disclosure. The embodiment of FIG. 12 will be described in more detail with reference to FIGS. 13A and 13B. FIGS. 13A and 13B illustrate conceptual diagrams illustrating an inertial correction using a biometric signal according to embodiments of the present disclosure.

In operation 1210, the electronic device 101 may sense motion information of the electronic device. As described above, the electronic device 101 may include sensors such as a linear acceleration sensor, a gyro sensor, and a geomagnetic sensor, which may sense various linear accelerations, rotation angle accelerations, or orientation information of the electronic device. The electronic device 101 may acquire motion information of the electronic device 101 based on output values from the various sensors.

In operation 1220, the electronic device 101 may sense a biometric signal. According to an embodiment, the electronic device 101 may sense an electromyograph (EMG) signal. The EMG signal relates to electrical activity of a user's muscle and indicates electrical activity through a contraction or relaxation of the muscle. Since the muscle is under the control of a nerve and minute electric currents always flow in the muscle, information on the contraction or relaxation of the muscle may be analyzed by identifying the electric currents through electrodes. Meanwhile, it may be easily understood by those skilled in the art that there is no limitation in the type of signal if the signal can indicate a muscle movement state as well as the EMG signal.

In operation 1230, the electronic device 101 may determine whether the sensed motion information of the electronic device 101 is intended by the user based on the biometric signal. In operation 1240, the electronic device 101 may display a virtual reality screen by using a result of the determination.

For example, the electronic device 101 may determine motion information acquired while the biometric signal is not acquired as motion information by the inertial force. As illustrated in FIG. 13A, the electronic device 101 may receive the inertial force 612. Further, it is assumed that the electronic device 101 displays a left eye image and a right eye image corresponding to the first image 811. A sensor 1300 which may sense a biometric signal may be arranged near a user's neck, for example, attached to a strap. Accordingly, when the user turns the user's head, the sensor 1300 may sense a change in the biometric signal generated due to the contraction and relaxation of muscles. For example, when the user does not turn the user's head as illustrated in FIG. 13A, the sensor 1300 may not sense the biometric signal corresponding to the muscle movement. The electronic device 101 may sense motion information of the electronic device 101 including the inertial force 612 but determine that the motion information does not correspond to a motion intended by the user. That is, the electronic device 101 may not process the motion information acquired when the biometric signal is not sensed. The sensor 1300 may be included in an HMT device into which the electronic device may be inserted and, in this case, the electronic device 101 may receive information on the biometric signal from the HMT device through a wire or wirelessly.

Meanwhile, as illustrated in FIG. 13B, the user may turn the user's head to the right. In this case, the sensor 1300 may sense a biometric signal corresponding to the muscle movement. The electronic device 101 may determine motion information 810 acquired when the biometric signal is sensed as motion information intended by the user. Accordingly, the electronic device 101 may change the virtual reality screen from the first image 811 to the third image 813 in accordance with the motion information 810 and display a left eye image and a right eye image corresponding to the third image 813.

That is, the electronic device 101 may remove the motion information acquired while the biometric signal is not acquired as a part by the inertial force.

As described above, the electronic device 101 may perform the inertial force correction by using biometric information from the user.

Figure 14:
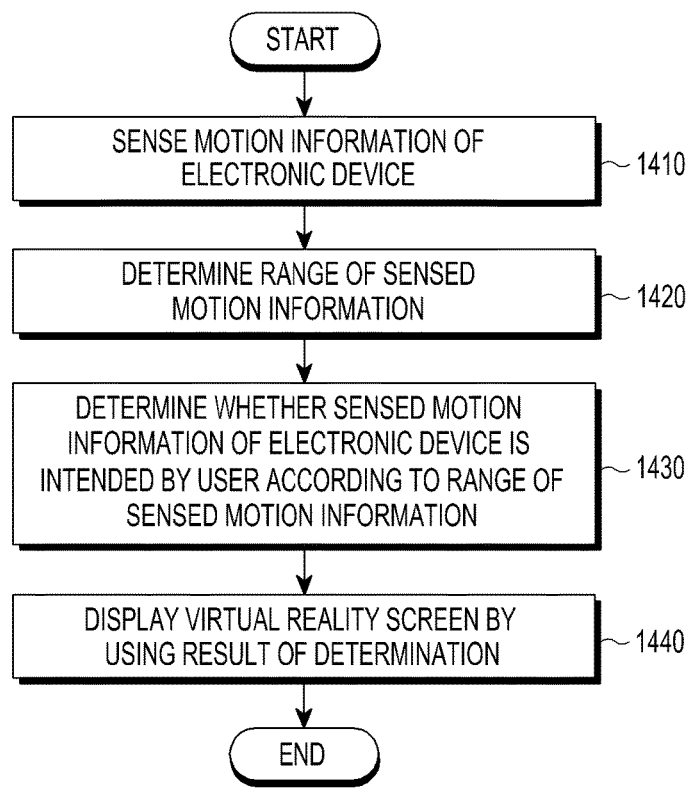
FIG. 14 illustrates a flowchart illustrating a control method of the electronic device according to various embodiments of the present disclosure.

FIG. 14 illustrate a flowchart illustrating a control method of the electronic device according to embodiments of the present disclosure.

In operation 1410, the electronic device 101 may sense motion information of the electronic device 101.

In operation 1420, the electronic device 101 may determine a range of the sensed motion information. For example, the electronic device 101 may preset the ranges shown in Table

TABLE 1

| Electronic device state | Acceleration range |
|---|---|
| Inertial acceleration | a to b |
| Acceleration by user | c to d |

The inertial acceleration by the acceleration of the transportation means may be included in, for example, the range from a to b. The acceleration by the user may be generated when the user turns the user's head in order to change the virtual reality screen and may be included in the range from c to d.

In operation 1430, the electronic device 101 may determine whether the sensed motion information of the electronic device is intended by the user according to the range of the sensed motion information. For example, the electronic device 101 may identify that an absolute value of the acceleration of the sensed motion is e. When e is included in the range from a to b, the electronic device 101 may determine that the sensed motion is the inertial force by the transportation means. Further, when e is included in the range from c to d, the electronic device 101 may determine that the sensed motion is intended by the user.

In operation 1440, the electronic device 101 may display the virtual reality screen by using a result of the determination.

As described above, the electronic device 101 may perform the inertial force correction by removing the inertial force component which corresponds to motion information, outside the preset ranges.

Figure 15:
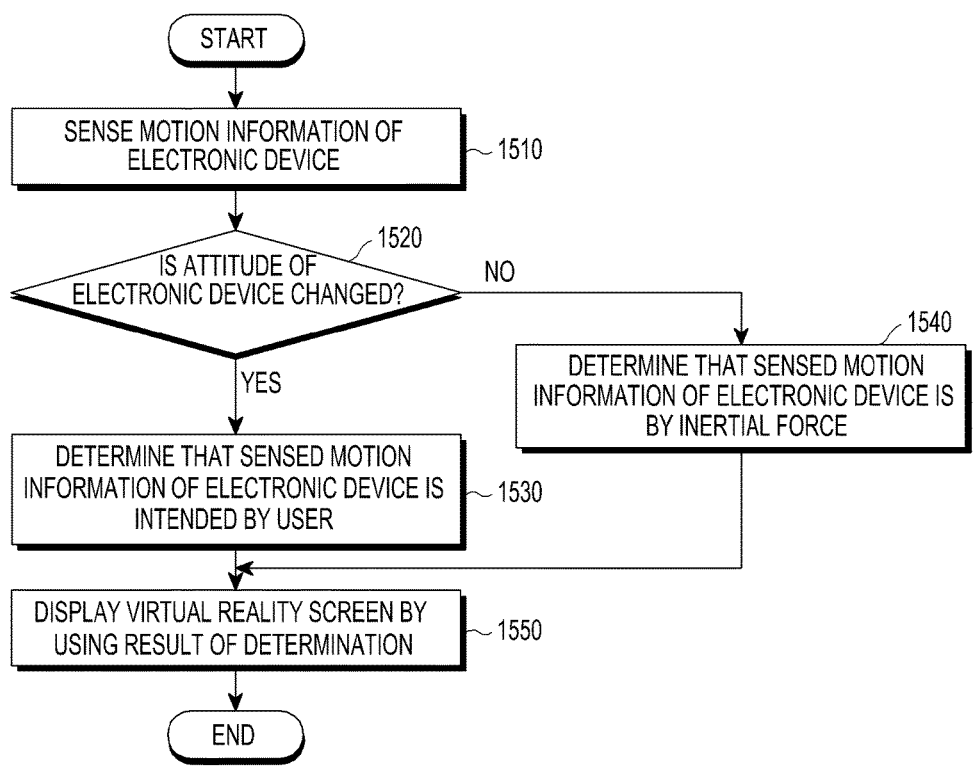
FIG. 15 illustrates a flowchart illustrating a control method of the electronic device according to various embodiments of the present disclosure.
Figure 16A:
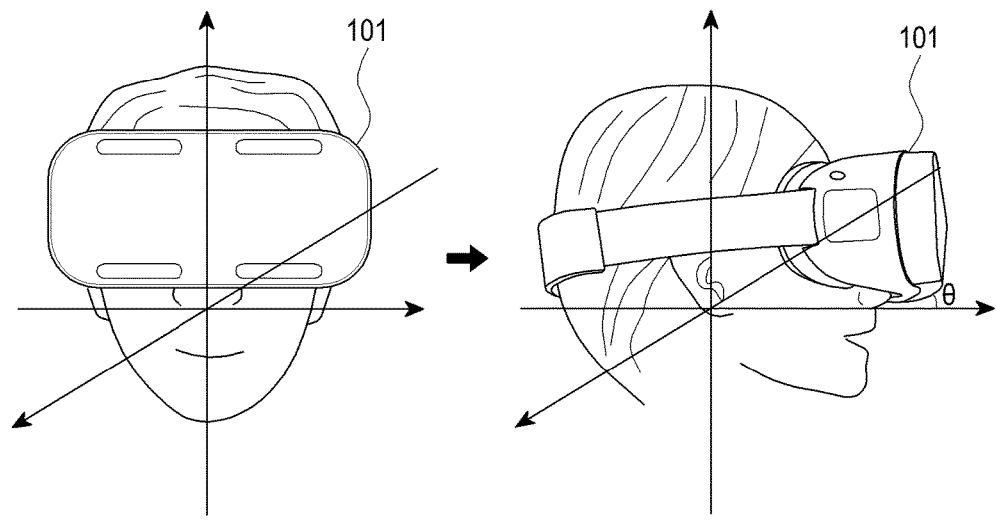
FIGS. 16A to 16C illustrate conceptual diagrams illustrating a change in an orientation of the electronic device 101 according to various embodiments of the present disclosure.
Figure 16B:
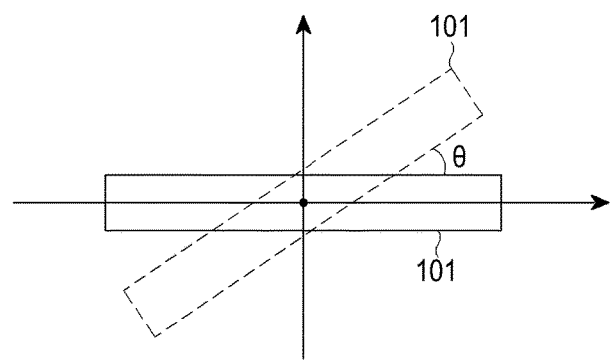
Figure 16C:
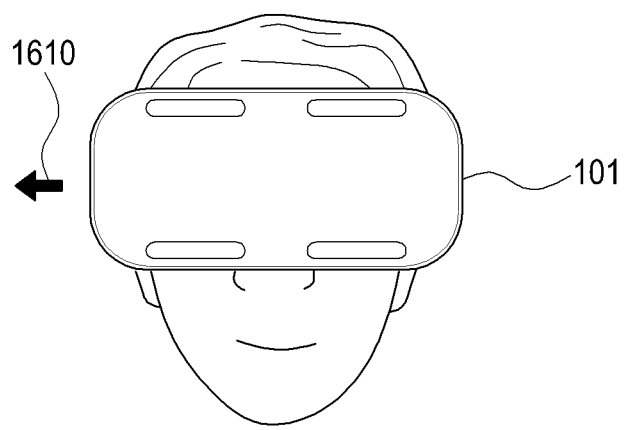

FIG. 15 illustrates a flowchart illustrating a control method of the electronic device according to embodiments of the present disclosure. The embodiment of FIG. 15 will be described in more detail with reference to FIGS. 16A to 16C. FIGS. 16A to 16C illustrate conceptual diagrams illustrating a change in an orientation of the electronic device 101 according to embodiments of the present disclosure.

In operation 1510, the electronic device 101 may sense motion information of the electronic device. The electronic device 101 may include sensors such as a linear acceleration sensor, a gyro sensor, and/or a geomagnetic sensor, which may sense various linear accelerations, rotation angle accelerations, and/or orientation information of the electronic device. The electronic device 101 may acquire motion information of the electronic device 101 based on output values from the various sensors. For example, the electronic device 101 may acquire a linear acceleration of the electronic device 101 based on the output value from the linear acceleration sensor. The electronic device 101 may acquire a rotation angle acceleration of the electronic device 101 based on the output value from the gyro sensor. The electronic device 101 may acquire a motion in orientation information on the electronic device 101 based on the output value from each of the gyro sensor and the geomagnetic sensor. The orientation information may include a tilt information with respect to at least one axis that passes through a reference point of the electronic device 101.

In operation 1520, the electronic device 101 may determine whether the orientation of the electronic device 101 is changed. The electronic device 101 may determine whether the orientation of the electronic device 101 is changed by determining whether there is a time sequential change in the tilt information with respect to at least one axis that passes through the reference point of the electronic device 101.

When it is determined that the orientation of the electronic device 101 is changed, the electronic device 101 may determine that the sensed motion information of the electronic device is intended by the user in operation 1530. For example, when the user turns the user's head while wearing the electronic device 101 as illustrated in FIGS. 16A and 16B, a tilt degree of the electronic device 101 may be changed by θ. FIG. 16B illustrates a plan view illustrating the electronic device 101 as viewed from above, and it may be noted that a tilt degree of the electronic device 101 is changed by θ in FIG. 16B. That is, the orientation of the electronic device 101 may be changed by a user's motion.

When it is determined that the orientation of the electronic device 101 is not changed, the electronic device 101 may determine that the sensed motion information of the electronic device 101 is by the inertial force in operation 1540. For example, when an inertial force 1610 is applied in a state where the user wears the electronic device 101 as illustrated in FIG. 16C, the orientation of the electronic device 101 is not changed. Accordingly, the electronic device 101 may determine that the sensed motion information without the change in the orientation information is by the inertial force 1610.

In operation 1550, the electronic device 101 may display the virtual reality screen by using a result of the determination. For example, when it is determined that the orientation of the electronic device 101 is changed, the electronic device 101 may determine that the sensed motion information of the electronic device is intended by the user, and change and display the virtual reality screen in accordance with the motion information. When it is determined that the orientation of the electronic device 101 is not changed, the electronic device 101 may determine that the sensed motion information of the electronic device 101 is by the inertial force and maintain the virtual reality screen without any change.

As described above, the electronic device 101 may perform an inertial force correction for removing the inertial force component which corresponds to the motion information acquired while the orientation information is not changed.

Figure 17:
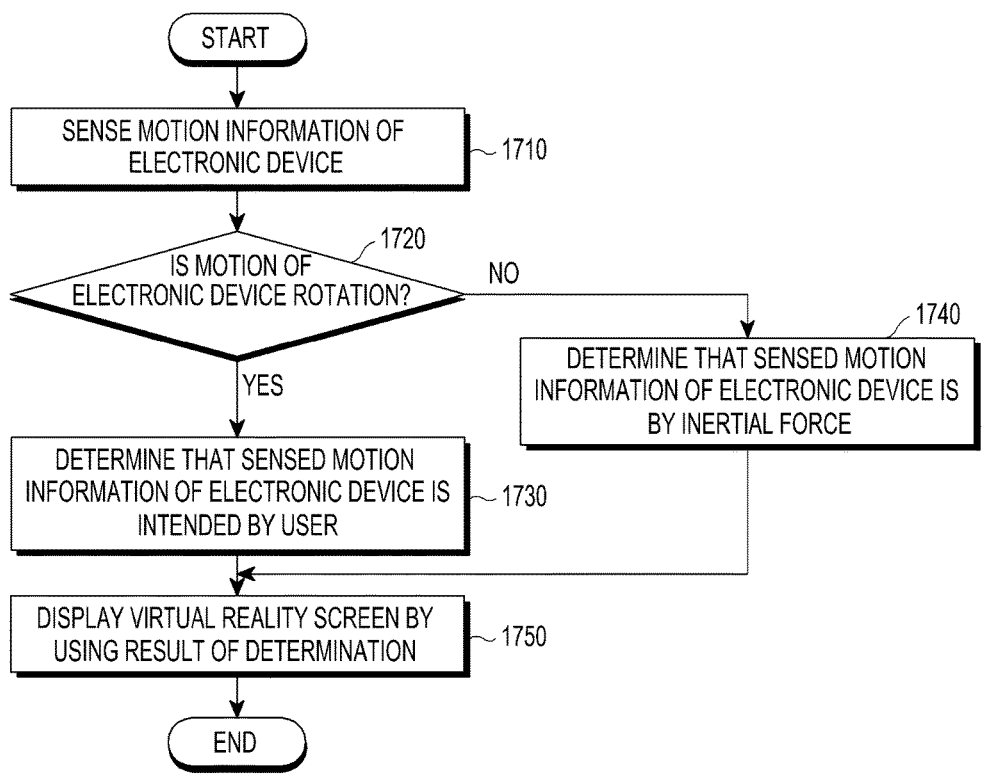
FIG. 17 illustrates a flowchart illustrating a control method of the electronic device according to various embodiments of the present disclosure.

FIG. 17 illustrates a flowchart illustrating a control method of the electronic device according to embodiments of the present disclosure.

In operation 1710, the electronic device 101 may sense motion information of the electronic device. The electronic device 101 may include sensors such as a linear acceleration sensor, a gyro sensor, and/or a geomagnetic sensor, which may sense various linear accelerations, rotation angle accelerations, and/or orientation information of the electronic device. The electronic device 101 may acquire motion information of the electronic device 101 based on output values from the various sensors.

In operation 1720, the electronic device 101 may determine whether the sensed motion is a rotation. For example, the electronic device 101 may sense a linear acceleration and a rotation angle acceleration and may determine whether the acquired motion information is the rotation by using the sensed data.

When it is determined that the sensed motion is the rotation, the electronic device 101 may determine that the sensed motion information of the electronic device is intended by the user in operation 1730. As illustrated in FIG. 16A, the user wearing the electronic device 101 may turn the user's head in order to view another virtual screen.

When it is determined that the sensed motion is not the rotation, the electronic device 101 may determine that the sensed motion information of the electronic device is by the inertial force in operation 1740. For example, when the electronic device 101 senses only the linear acceleration as illustrated in FIG. 16C, the electronic device 101 may determine that the sensed motion information is by the inertial force.

In operation 1750, the electronic device 101 may display the virtual reality screen by using a result of the determination. For example, when it is determined that the sensed motion is the rotation, the electronic device 101 may determine that the sensed motion information of the electronic device is intended by the user, and change and display the virtual reality screen in accordance with the motion information. When it is determined that the sensed motion of the electronic device 101 is not the rotation, the electronic device 101 may determine that the sensed motion information of the electronic device 101 is by the inertial force and maintain the virtual reality screen without any change.

As described above, the electronic device 101 may perform the inertial force correction for removing the inertial force component which corresponds to a linear component of the motion information. Particularly, when the user boards an airplane which mainly performs linear acceleration, the accuracy of the inertial force correction may be further improved.

Figure 18:
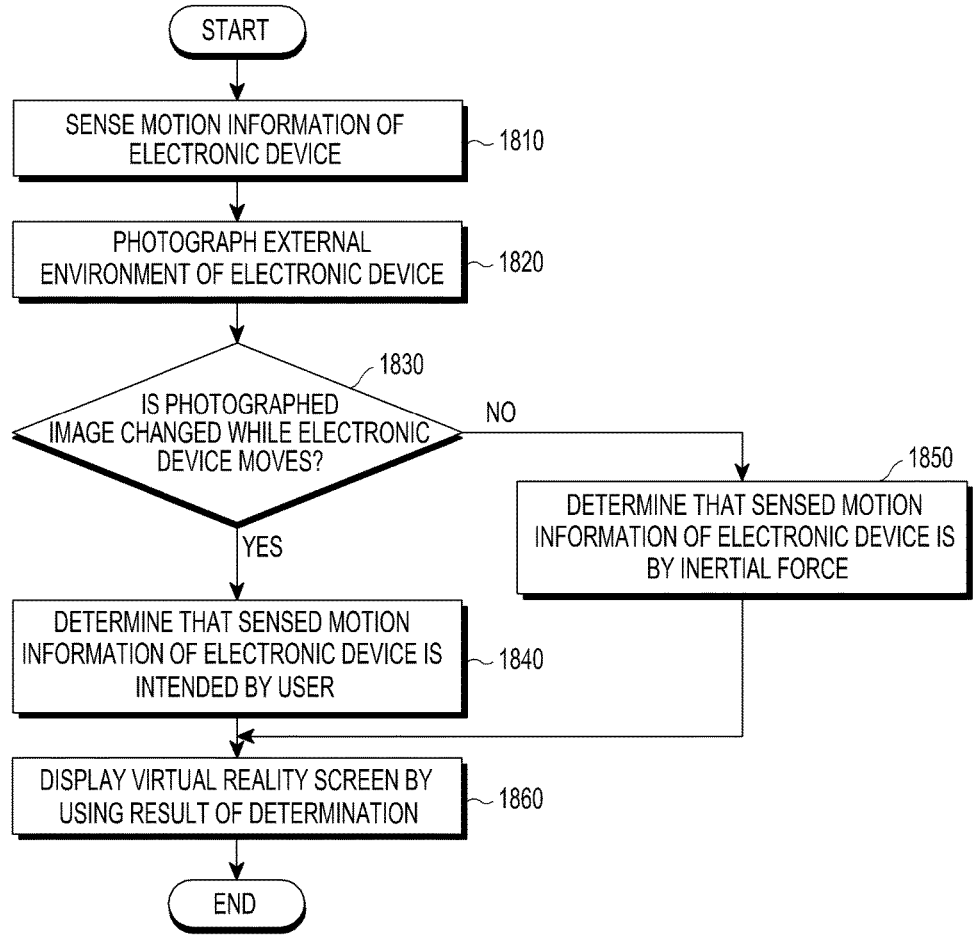
FIG. 18 illustrates a flowchart illustrating a control method of the electronic device according to various embodiments of the present disclosure.
Figure 19A:
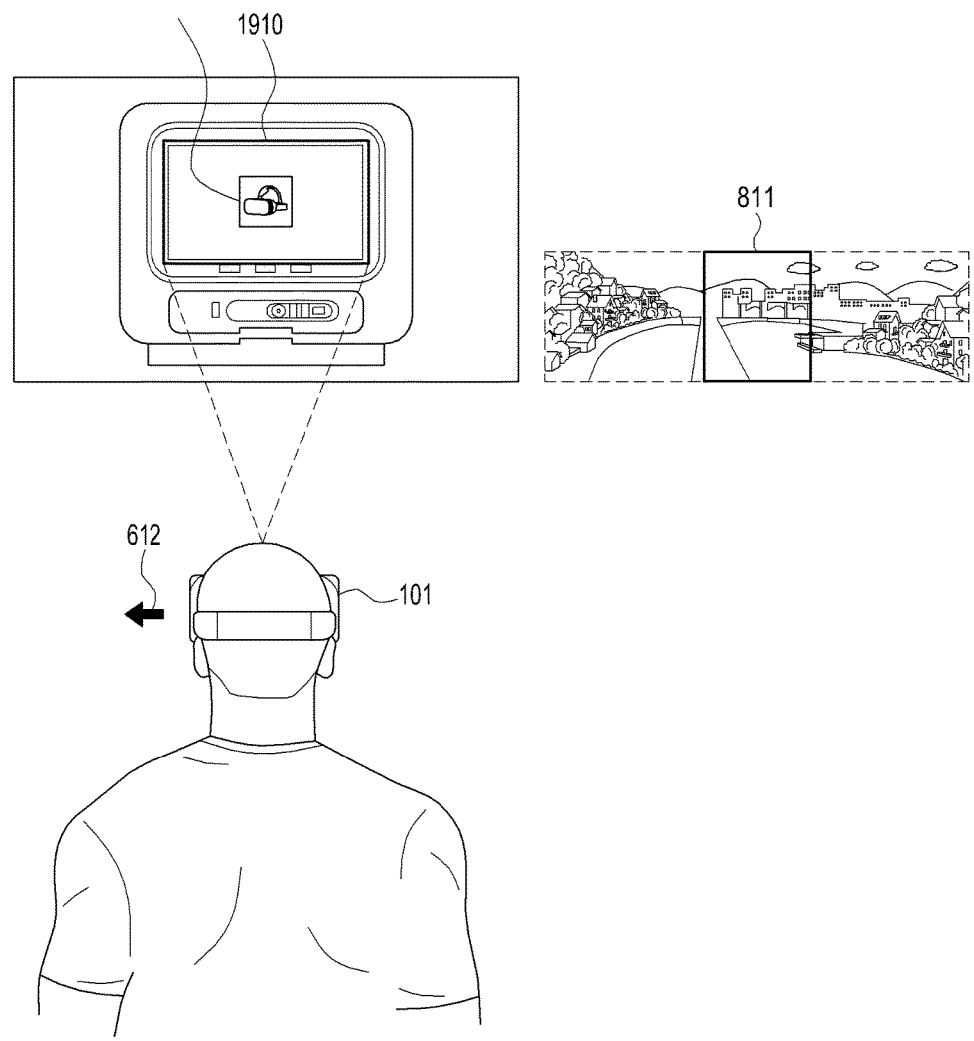
FIGS. 19A and 19B illustrate conceptual diagrams illustrating an inertial force correction of the electronic device according to various embodiments of the present disclosure.
Figure 19B:
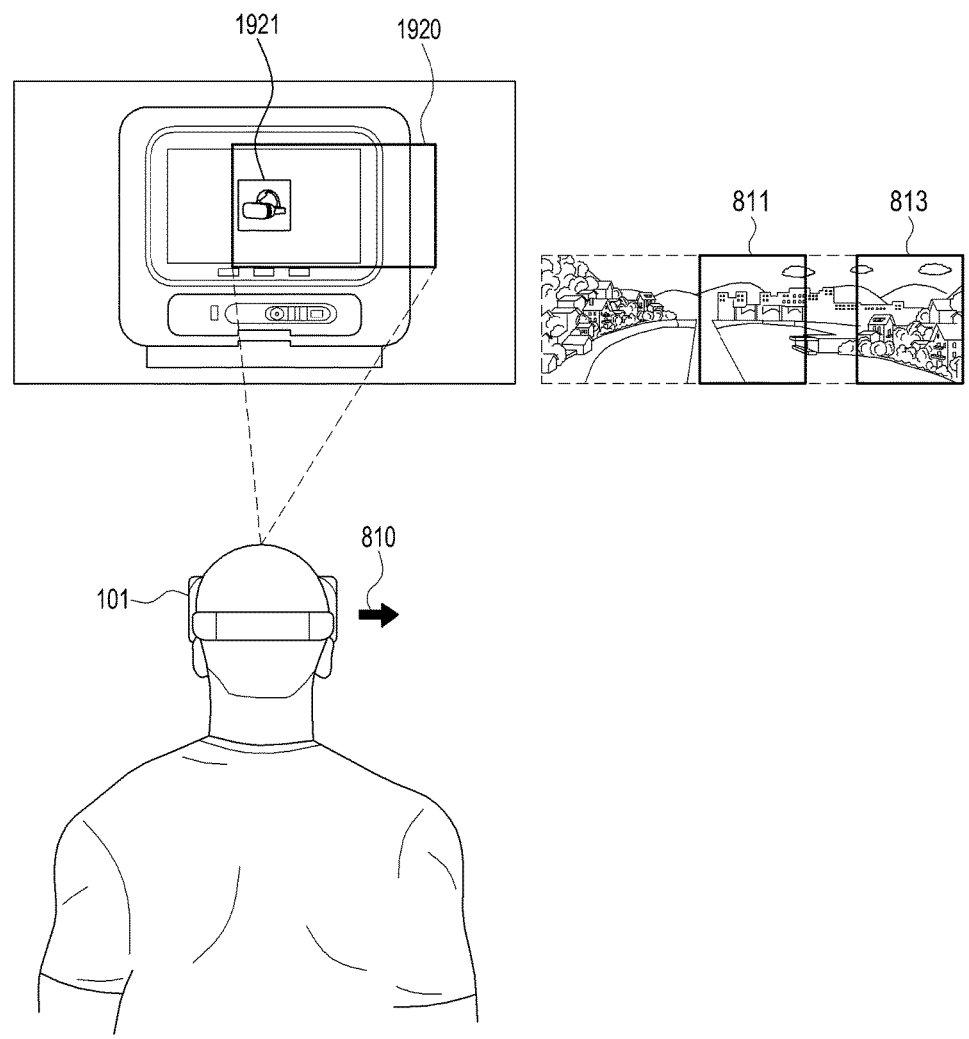

FIG. 18 illustrates a flowchart illustrating a control method of the electronic device according to embodiments of the present disclosure. The embodiment of FIG. 18 will be described in more detail with reference to FIGS. 19A and 19B. FIGS. 19A and 19B illustrate conceptual diagrams illustrating an inertial force correction of the electronic device according to embodiments of the present disclosure.

In operation 1810, the electronic device 101 may sense motion information of the electronic device 101. The electronic device 101 may include sensors such as a linear acceleration sensor, a gyro sensor, and/or a geomagnetic sensor, which may sense various linear accelerations, rotation angle accelerations, and/or orientation information of the electronic device. The electronic device 101 may acquire motion information of the electronic device 101 based on output values from the various sensors.

In operation 1820, the electronic device 101 may acquire an image by photographing an external environment of the electronic device 101. The electronic device 101 may acquire a plurality of image frames over time. The electronic device 101 may include a camera module that captures the plurality of image frames of an external environment. Alternatively, the electronic device 101 may not include the camera module and, in this case, may receive a plurality of image frames from another electronic device including the camera module.

In operation 1830, the electronic device 101 may determine whether images photographed while the electronic device 101 moves are changed. The electronic device 101 may determine whether images are changed by comparing adjacent image frames in the plurality of image frames. The electronic device 101 may determine whether the images are changed based on a marker scheme or a markerless scheme.

When it is determined that the images are changed, the electronic device 101 may determine that the sensed motion information of the electronic device 101 is intended by the user in operation 1840.

When it is determined that the images are not changed, the electronic device 101 may determine that the sensed motion information of the electronic device is by the inertial force in operation 1850.

In operation 1860, the electronic device 101 may display the virtual reality screen by using a result of the determination. When it is determined that the images are changed, the electronic device 101 may determine that the sensed motion information of the electronic device 101 is intended by the user, and change and display the virtual reality screen in accordance with the motion information. When it is determined that the images are not changed, the electronic device 101 may determine that the sensed motion information of the electronic device is by the inertial force and maintain the displaying of the virtual reality screen.

For example, in FIG. 19A, the electronic device 101 may determine that the images are changed through the marker scheme. The electronic device 101 may acquire an image for a first external environment 1910 including a marker 1911 through the camera module. In this case, the inertial force 612 may be applied to the electronic device 101 but the electronic device 101 does not detect the image change. Since the electronic device 101 has not detected the image change, the electronic device 101 may maintain a left eye image and a right eye image corresponding to the first screen 811.

On the contrary to this, the electronic device 101 may acquire an image for a second external environment 1920 including a marker 1921 in FIG. 19B. The user may acquire the second external environment 1920 different from the first external environment 1910 by rotating the head as indicated by reference numeral 810. The electronic device 101 determine the image change according to the change in a location of the marker 1921 of the image for the second external environment 1920 and a location of the marker 1911 of the image for the first external environment 1910. The electronic device 101 may change the first screen 811 to the third screen 813 in accordance with the motion acquired while the images are changed and display the third image 813.

As described above, the electronic device 101 may perform the inertial force correction for removing inertial force component which corresponds to the motion information acquired while the adjacent images of the plurality of images are not changed.

Figure 20:
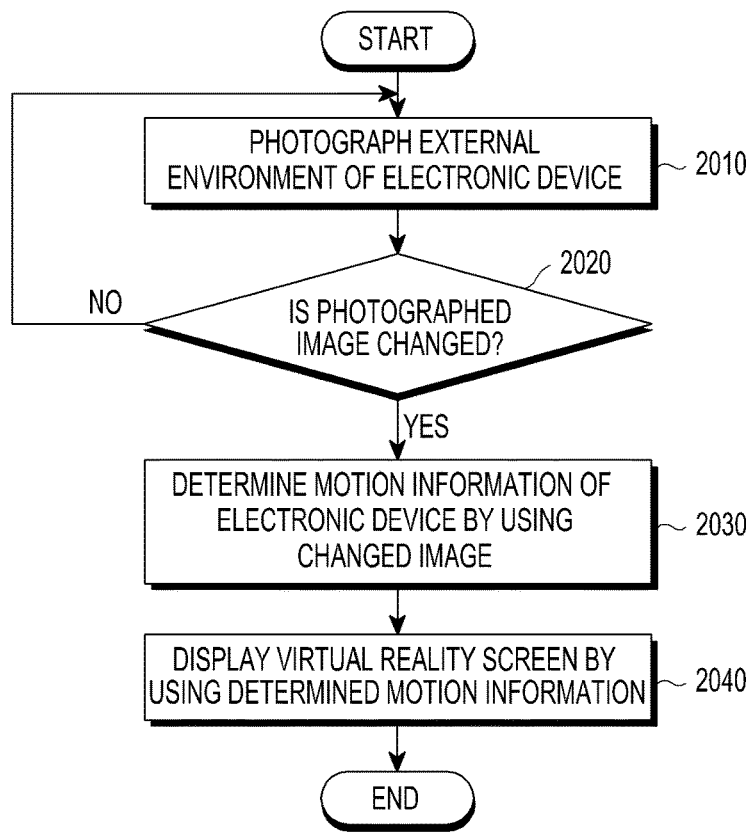
FIG. 20 illustrates a flowchart illustrating a control method of the electronic device according to various embodiments of the present disclosure.
Figure 21A:
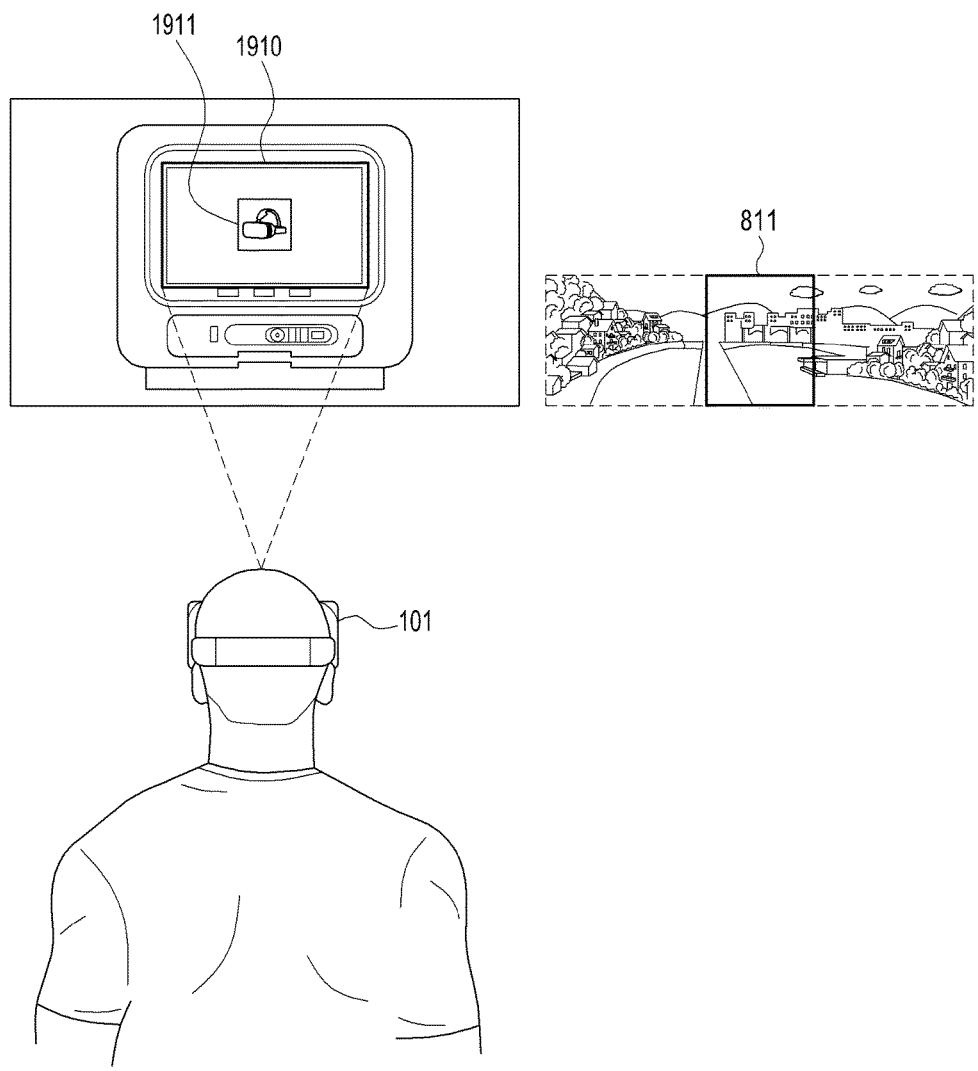
FIGS. 21A and 21B illustrate conceptual diagrams illustrating an electronic device according to various embodiments of the present disclosure.
Figure 21B:
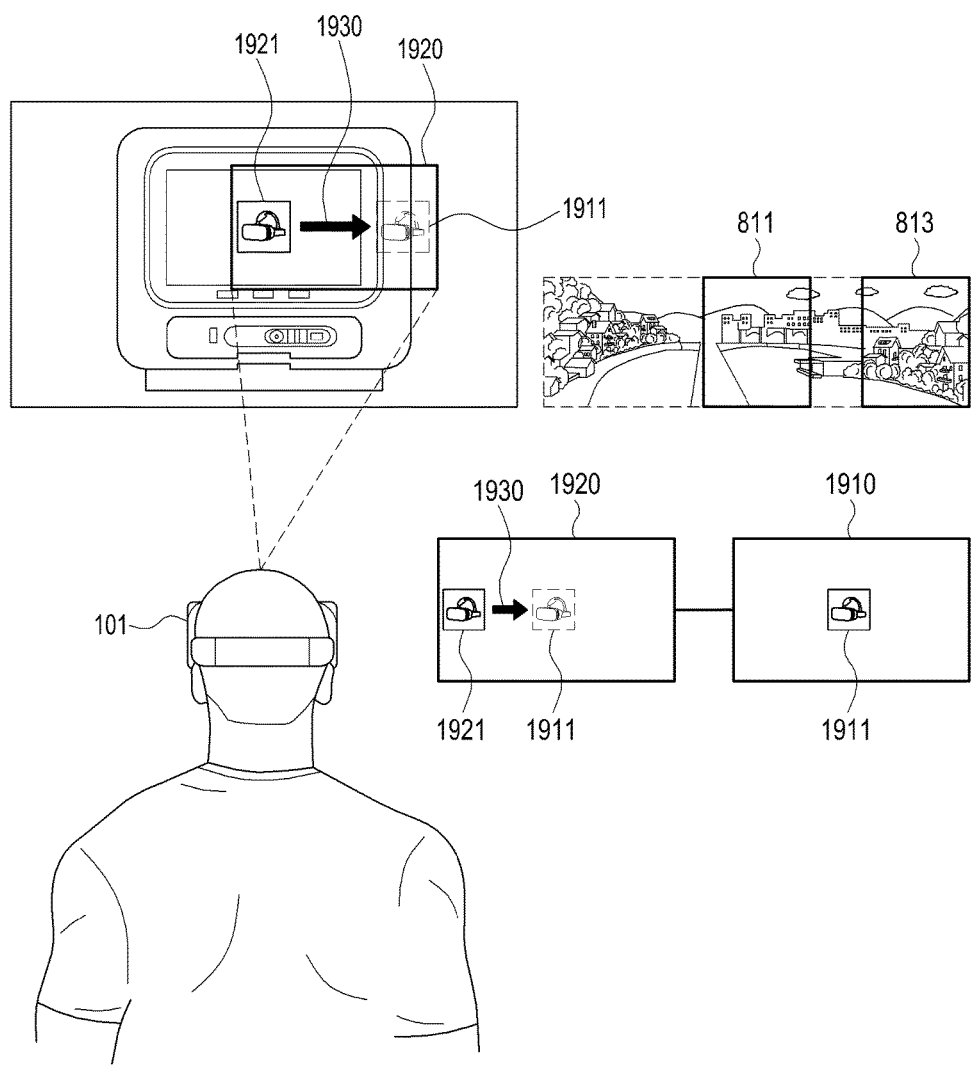

FIG. 20 illustrates a flowchart illustrating a control method of the electronic device according to embodiments of the present disclosure. The embodiment of FIG. 20 will be described in more detail with reference to FIGS. 21A and 21B. FIGS. 21A and 21B illustrate conceptual diagrams illustrating an electronic device according to embodiments of the present disclosure.

In operation 2010, the electronic device 101 may acquire an image by photographing an external environment of the electronic device 101. The electronic device 101 may acquire a plurality of image frames according to the time. The electronic device 101 may include a camera module that capture the plurality of image frames of an external environment. Alternatively, the electronic device 101 may not include the camera module and, in this case, may receive a plurality of image frames from another electronic device including the camera module.

In operation 2020, the electronic device 101 may determine whether images photographed while the electronic device 101 moves are changed. The electronic device 101 may determine whether images are changed by comparing adjacent image frames in the plurality of image frames. The electronic device 101 may determine whether the images are changed based on a marker scheme or a markerless scheme.

In operation 2030, the electronic device 101 may determine motion information of the electronic device by using the changed images. In operation 2040, the electronic device 101 may display a virtual reality screen by using the determined motion information. For example, in FIG. 21A, the electronic device 101 may determine that the images are changed through the marker scheme. The electronic device 101 may acquire an image for a first external environment 1910 including a marker 1911 through the camera module. Further, the electronic device 101 may acquire the image for the second external environment 1920 including a marker 1921 in FIG. 21B. The user may acquire the second external environment 1920 different from the first external environment 1910 by rotating the head as indicated by reference numeral 810. The electronic device 101 may acquire motion information 1930 according to the change in a location of the marker 1921 of the image for the second external environment 1920 and a location of the marker 1911 for the first external environment 1910. According to embodiments of the present disclosure, the electronic device 101 may acquire three dimensional information by using a depth camera or a time of flight (TOF) camera and, accordingly, acquire three dimensional motion information. The electronic device 101 may change the first screen 811 to the third screen 813 in accordance with the motion acquired while the images are changed and display the third image 813.

As described above, the electronic device 101 may set a reference point. When using optical information, the electronic device 101 may set the reference point and ignore an acceleration and a vibration value measured when the reference point is not changed. The electronic device 101 may perform initial rendering. The electronic device 101 may first identify whether a location of the reference point is changed when there is a motion, and maintain the existing image when there is no motion. Otherwise, the electronic device 101 may perform rendering by using head tracking information when the motion is smaller than a preset threshold. When the motion is larger than the threshold, the electronic device 101 may provide the same force in an opposite direction to offset the force and display information which the user desires on the screen.

Figure 22:
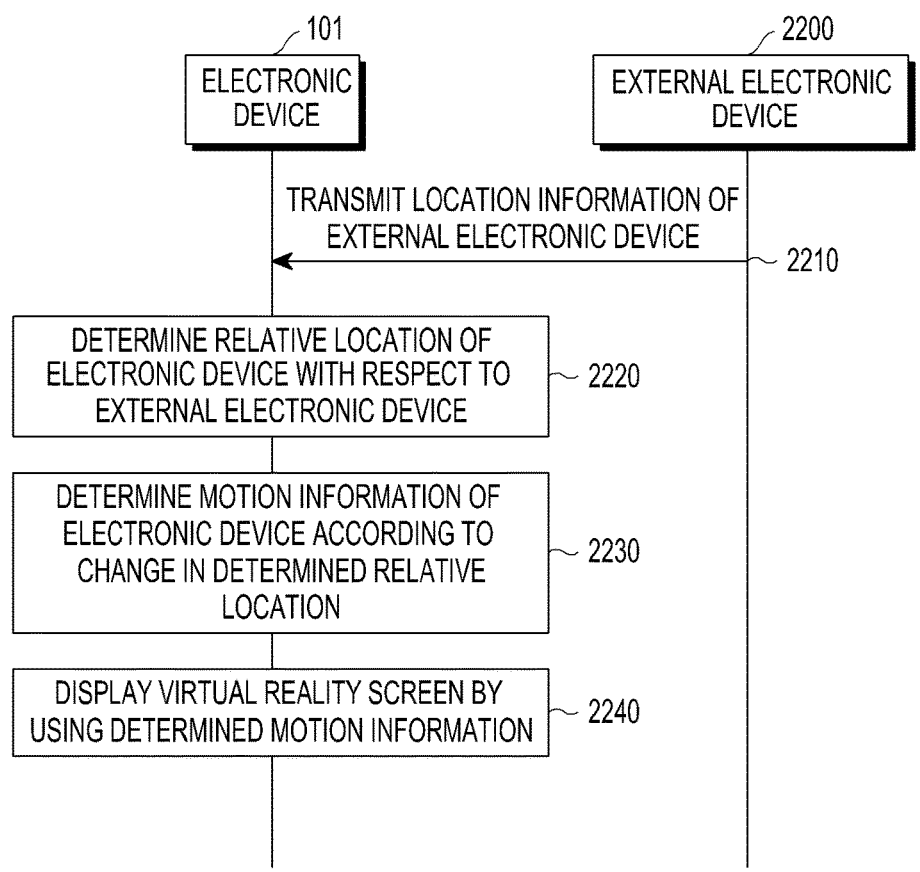
FIG. 22 illustrates a flowchart illustrating a control method of the electronic device according to various embodiments of the present disclosure.
Figure 23:
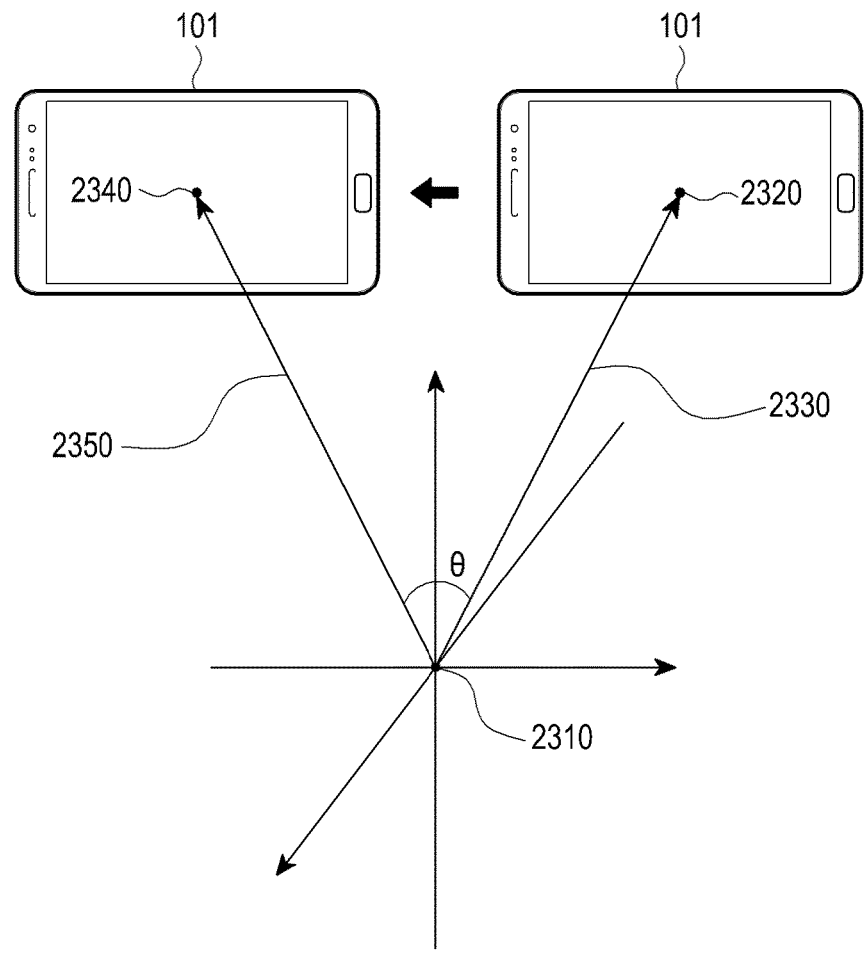
FIG. 23 illustrates a conceptual diagram illustrating an electronic device according to various embodiments of the present disclosure.

FIG. 22 illustrates flowchart illustrating a control method of the electronic device according to embodiments of the present disclosure. The embodiment of FIG. 22 will be described in more detail with reference to FIG. 23. FIG. 23 illustrates a conceptual diagram illustrating the electronic device according to embodiments of the present disclosure.

In operation 2210, an external electronic device 2200 may transmit location information of the external electronic device 2200 to the electronic device 101.

In operation 2220, the electronic device 101 may determine a relative location of the electronic device 101 with respect to the external electronic device 2200. The electronic device 101 may determine the received location of the electronic device 101 with respect to the external electronic device 2200 and, accordingly, determine the relative location.

In operation 2230, the electronic device 101 may determine motion information of the electronic device 101 according to a change in the determined relative location. For example, as illustrated in FIG. 23, the electronic device 101 may determine a first relative location 2330 of the electronic device 101 with respect to a reference 2310. The reference 2310 may be the location of the external electronic device 2200. The electronic device 101 may determine the first relative location 2330 based on, for example, displacement between one point 2320 of the electronic device 101 and the reference 2310. The electronic device 101 may determine a second relative location 2350 of the electronic device 101 with respect to the reference 2310. The electronic device 101 may determine the second relative location 2350 based on, for example, displacement between one point 2340 of the electronic device 101 and the reference 2310. The electronic device 101 may determine motion information according to a difference θ between the first relative location 2330 and the second relative location 2350.

In operation 2240, the electronic device 101 may display a virtual reality screen by using the determined motion information.

According to embodiments of the present disclosure, a method of controlling an electronic device may include: an operation of acquiring motion information of an electronic device; an operation of performing an inertial force correction for removing an inertial force component from the acquired motion information; and an operation of displaying a screen corresponding to the inertial force-corrected motion information.

According to embodiments of the present disclosure, the method of controlling the electronic device may further include an operation of acquiring the inertial force component.

According to embodiments of the present disclosure, the operation of acquiring the inertial force component may include an operation of receiving the inertial force from another electronic device which is physically separated from the electronic device and sensing the inertial force.

According to embodiments of the present disclosure, the operation of performing the inertial force correction may include: an operation of generating a corrected vector by adding an inverse vector of an inertial acceleration corresponding to the inertial force and an acceleration corresponding to the motion information and the operation of displaying the screen corresponding to the inertial force-corrected motion information may include an operation of displaying a screen corresponding to the generated corrected vector.

According to various embodiments of the present disclosure, the operation of performing of the inertial force correction may include: an operation of acquiring a biometric signal from at least one user's body part which generates the biometric signal when the user moves the electronic device; and an operation of removing the inertial force component which corresponds to motion information acquired while the biometric signal is not acquired.

According to various embodiments of the present disclosure, the operation of performing the inertial force correction may include: an operation of determining whether the motion information is included in a preset range; and an operation of removing the inertial force component which corresponds to motion information outside the preset range.

According to embodiments of the present disclosure, the operation of performing the inertial force correction may include: an operation of acquiring orientation information of the electronic device; and an operation of removing the inertial force component which corresponds to motion information acquired while orientation information is not changed e.

According to various embodiments of the present disclosure, the operation of performing the inertial force correction may include an operation of removing the inertial force component which corresponds to a linear component of the motion information.

According to various embodiments of the present disclosure, the operation of displaying the screen corresponding to the inertial force-corrected motion information may include an operation of displaying the screen in accordance with a rotation component of the motion information.

According to various embodiments of the present disclosure, the method of controlling the electronic device may further include an operation of acquiring a plurality of images generated by photographing an external environment of the electronic device, and the operation of performing the inertial force correction may include an operation of removing the inertial force component which corresponds to motion information acquired while adjacent images of the plurality of images are not changed.

Each of the components of the electronic device according to the present disclosure may be implemented by one or more components and the name of the corresponding component may vary depending on a type of the electronic device. In various embodiments, the electronic device may include at least one of the above-described elements. Some of the above-described elements may be omitted from the electronic device, or the electronic device may further include additional elements. Further, some of the components of the electronic device according to the various embodiments of the present disclosure may be combined to form a single entity, and thus, may equivalently execute functions of the corresponding elements prior to the combination.

The term "module" used in the present disclosure may refer to, for example, a unit including one or more combinations of hardware, software, and firmware. The "module" may be interchangeable with a term, such as a unit, a logic, a logical block, a component, or a circuit. The "module" may be the smallest unit of an integrated component or a part thereof. The "module" may be a minimum unit for performing one or more functions or a part thereof. The "module" may be mechanically or electronically implemented. For example, the "module" according to the present disclosure may include at least one of an application-specific integrated circuit (ASIC) chip, a field-programmable gate arrays (FPGA), and a programmable-logic device for performing operations which has been known or are to be developed hereinafter.

According to embodiments, at least some of the devices (for example, modules or functions thereof) or the method (for example, operations) according to the present disclosure may be implemented by a command stored in a computer-readable storage medium in a program module form. When the command is executed by one or more processors (for example, the processor 120), the one or more processors may execute a function corresponding to the command. The computer-readable storage medium may be, for example, the memory 130.

The computer readable recoding medium may include a hard disk, a floppy disk, magnetic media (e.g., a magnetic tape), optical media (e.g., a compact disc read only memory (CD-ROM) and a digital versatile disc (DVD)), magneto-optical media (e.g., a floptical disk), a hardware device (e.g., a read only memory (ROM), a random access memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to embodiments of the present disclosure may be executed sequentially, in parallel, repeatedly, or in a heuristic manner. Further, some operations may be executed according to another order or may be omitted, or other operations may be added.

According to embodiments of the present disclosure, a storage medium having instructions stored therein is provided. The instructions are configured to instruct one or more processors to perform one or more operations when the instructions are executed. The one or more operations may include: an operation of acquiring motion information of an electronic device; an operation of performing an inertial force correction for removing a part by an inertial force from the acquired motion information; and an operation of displaying a screen corresponding to the inertial force-corrected motion information.

Although the present disclosure has been described with an exemplary embodiment, various changes and modifications may be suggested to one skilled in the art. It is intended that the present disclosure encompass such changes and modifications as fall within the scope of the appended claims.

What is claimed is:
1. A method of controlling an electronic device, the method comprising:
   acquiring motion information of the electronic device and a plurality of images generated by photographing an external environment of the electronic device;

acquiring information on inertial acceleration by processing the plurality of images;

performing an inertial force correction for removing an inertial force component from the acquired motion information by using an inverse vector of the inertial acceleration corresponding to an inertial force; and displaying a screen corresponding to the inertial force-corrected motion information, wherein the inertial force correction comprises removing the inertial force component that corresponds to motion information acquired while adjacent images of the plurality of images are not changed, wherein the performing of the inertial force correction comprises:

acquiring a biometric signal from a body part of at least one user when the user moves the electronic device, and removing the inertial force component that corresponds to motion information acquired when the biometric signal is not acquired.

2. The method of claim 1, wherein the acquiring of the inertial force comprises receiving the inertial force from another electronic device which is physically separated from the electronic device and senses the inertial force.

3. The method of claim 1, wherein the performing the inertial force correction comprises generating a corrected vector by adding the inverse vector of the inertial acceleration corresponding to the inertial force and an acceleration corresponding to the motion information, and the displaying of the screen corresponding to the inertial force-corrected motion information comprises displaying a screen corresponding to the generated corrected vector.

4. The method of claim 1, wherein the performing of the inertial force correction comprises:

determining whether the motion information is included in a preset range; and removing the inertial force component which corresponds to motion information outside of the preset range.

5. The method of claim 1, wherein the performing of the inertial force correction comprises:

acquiring orientation information of the electronic device; and removing the inertial force component which corresponds to motion information acquired while orientation information is not changed.

6. The method of claim 1, wherein the performing of the inertial force correction comprises removing the inertial force component which corresponds to a linear component of the motion information.

7. The method of claim 6, wherein the displaying of the screen corresponding to the inertial force-corrected motion information comprises displaying the screen in accordance with a rotation component of the motion information.

8. An electronic device comprising:
a display;
a camera;
a processor electrically connected to the display; and
a motion information sensing module that is electrically connected to the processor and configured to acquire motion information of the electronic device, wherein the processor is configured to:

acquire, through the camera, a plurality of images generated by photographing an external environment of the electronic device;

acquire information on inertial acceleration by processing the plurality of images; and perform an inertial force correction for removing an inertial force component from the acquired motion information by using an inverse vector of an inertial acceleration corresponding to an inertial force and to control the display to display a screen corresponding to the inertial force-corrected motion information, wherein the processor is configured to remove the inertial force component that corresponds to motion information acquired while adjacent images of the plurality of images are not changed, wherein the processor is configured to:

acquire a biometric signal from a body part of at least one user when the user moves the electronic device, and remove the inertial force component that corresponds to motion information acquired when the biometric signal is not acquired.

9. The electronic device of claim 8, further comprising a communication module configured to receive the inertial force from another electronic device which is physically separated from the electronic device, wherein the another electronic device senses the inertial force.

10. The electronic device of claim 8, wherein the processor is configured to generate a corrected vector by adding the inverse vector of the inertial acceleration corresponding to the inertial force and an acceleration corresponding to the motion information and to control the display to display a screen corresponding to the generated corrected vector.

11. The electronic device of claim 8, wherein the processor is configured to determine whether the motion information is included in a preset range and to remove the inertial force component which corresponds to motion information outside the preset range.

12. The electronic device of claim 8, wherein the processor is configured to acquire orientation information of the electronic device and to remove the inertial force component which corresponds to motion information acquired while orientation information is not changed.

13. The electronic device of claim 8, wherein the processor is configured to remove the inertial force component which corresponds to a linear component of the motion information.

14. The electronic device of claim 13, wherein the processor is configured to control the display to display the screen in accordance with a rotation component of the motion information.

* * * * *